(12) United States Patent
Denton et al.

(10) Patent No.: US 9,975,793 B2
(45) Date of Patent: May 22, 2018

(54) REMOVING CARBON NANOTUBES FROM A WATER SYSTEM

(71) Applicants: ExxonMobil Upstream Research Company, Houston, TX (US); Solid Carbon Products LLC, Provo, UT (US)

(72) Inventors: Robert D. Denton, Houston, TX (US); Dallas B. Noyes, Provo, UT (US); Russell J. Koveal, Jr., Baton Rouge, LA (US); Terry A. Ring, Sandy, UT (US)

(73) Assignees: EXXONMOBIL UPSTREAM RESEARCH COMPANY, Houston, TX (US); SOLID CARBON PRODUCTS, LLC, Provo, UT (US)

( * ) Notice: Subject to any disclaimer, the term of this patent is extended or adjusted under 35 U.S.C. 154(b) by 666 days.

(21) Appl. No.: 14/395,450

(22) PCT Filed: Apr. 10, 2013

(86) PCT No.: PCT/US2013/035991
§ 371 (c)(1),
(2) Date: Oct. 17, 2014

(87) PCT Pub. No.: WO2013/158441
PCT Pub. Date: Oct. 24, 2013

(65) Prior Publication Data
US 2015/0114819 A1   Apr. 30, 2015

Related U.S. Application Data

(60) Provisional application No. 61/625,672, filed on Apr. 18, 2012.

(51) Int. Cl.
*C02F 1/72* (2006.01)
*C01B 32/168* (2017.01)
(Continued)

(52) U.S. Cl.
CPC .................. *C02F 1/72* (2013.01); *B03D 1/24* (2013.01); *C02F 1/04* (2013.01); *C02F 1/24* (2013.01);
(Continued)

(58) Field of Classification Search
CPC .... C02F 1/52; C02F 1/72; C02F 1/725; C02F 1/74; C02F 1/78; C01B 31/022–31/0246
See application file for complete search history.

(56) References Cited

U.S. PATENT DOCUMENTS 2,796,331 A    6/1957  Kauffman et al.
4,340,487 A *  7/1982  Lyon ...................... B01D 37/03
                                                          210/705
(Continued)

FOREIGN PATENT DOCUMENTS

CN     1107443 A     8/1995
CN     1162455 A    10/1997
(Continued)

OTHER PUBLICATIONS

Machine translation of CN 101885527, obtained from Google Patents Apr. 21, 2017.*
(Continued)

*Primary Examiner* — Renee Robinson
(74) *Attorney, Agent, or Firm* — International IP Law Group, P.L.L.C.

(57) ABSTRACT

Methods and a system for removing carbon nanotubes from a water stream are provided herein. The system includes a purification vessel, wherein the purification vessel is configured to form a carbon oxide from the carbon nanotubes within the water stream.

27 Claims, 14 Drawing Sheets

(51) Int. Cl.

| | | |
|---|---|---|
| *C02F 1/44* | (2006.01) | |
| *C02F 1/74* | (2006.01) | |
| *C02F 1/78* | (2006.01) | |
| *B03D 1/24* | (2006.01) | |
| *C02F 1/04* | (2006.01) | |
| *C02F 1/24* | (2006.01) | |
| *C02F 1/52* | (2006.01) | |
| *C02F 9/00* | (2006.01) | |
| C01B 32/16 | (2017.01) | |
| C02F 1/28 | (2006.01) | |
| C02F 1/38 | (2006.01) | |
| C02F 1/56 | (2006.01) | |
| C02F 103/36 | (2006.01) | |
| B01D 21/26 | (2006.01) | |
| C02F 101/10 | (2006.01) | |
| C02F 103/34 | (2006.01) | |

(52) U.S. Cl.
CPC ............... *C02F 1/441* (2013.01); *C02F 1/52* (2013.01); *C02F 1/725* (2013.01); *C02F 1/74* (2013.01); *C02F 1/78* (2013.01); *C02F 9/00* (2013.01); *B01D 21/267* (2013.01); *C01B 32/16* (2017.08); *C01B 32/168* (2017.08); *C02F 1/283* (2013.01); *C02F 1/38* (2013.01); *C02F 1/56* (2013.01); *C02F 2101/10* (2013.01); *C02F 2103/34* (2013.01); *C02F 2103/36* (2013.01); *C02F 2305/08* (2013.01)

(56) References Cited

U.S. PATENT DOCUMENTS

| | | | |
|---|---|---|---|
| 4,490,258 A | 12/1984 | Heijnen et al. | |
| 5,370,528 A | 12/1994 | Mattus | |
| 7,585,483 B2 | 9/2009 | Edwin et al. | |
| 2002/0040875 A1* | 4/2002 | Conrad ............... | C02F 1/78 210/748.19 |
| 2002/0056688 A1 | 5/2002 | Stephenson et al. | |
| 2002/0092761 A1 | 7/2002 | Nagler | |
| 2005/0074392 A1 | 4/2005 | Yang et al. | |
| 2005/0139555 A1 | 6/2005 | Dancuart Kohler et al. | |
| 2008/0078725 A1 | 4/2008 | Felch et al. | |
| 2010/0254868 A1 | 10/2010 | Obee et al. | |
| 2010/0316556 A1 | 12/2010 | Wei et al. | |
| 2011/0021645 A1 | 1/2011 | Locatelli et al. | |
| 2011/0085961 A1* | 4/2011 | Noda ................... | B01J 37/0217 423/447.3 |
| 2012/0037840 A1 | 2/2012 | Stucky et al. | |

FOREIGN PATENT DOCUMENTS

| | | |
|---|---|---|
| CN | 101712469 A | 5/2010 |
| CN | 101778804 A | 7/2010 |
| CN | 101885527 A | 11/2010 |
| CN | 101965391 A | 2/2011 |
| EP | 0 668 244 A1 | 8/1995 |
| EP | 2168915 A2 | 3/2010 |
| JP | S56-033085 A | 11/1982 |
| JP | 2002-211909 A | 7/2002 |
| JP | 2006-514579 A | 5/2006 |
| JP | 2008100901 A | 5/2008 |
| JP | 2009-242233 A | 10/2009 |
| JP | 2010-083753 A | 4/2010 |
| JP | 2011-132078 A | 7/2011 |
| JP | 2011-178660 A | 9/2011 |
| NL | 7209891 A | 1/1974 |
| WO | WO/2010/120581 A1 | 10/2010 |
| WO | WO2011000052 A1 | 1/2011 |
| WO | 2013/090444 A1 | 6/2013 |

OTHER PUBLICATIONS

Australian Patent Examination Report No. 1, dated Sep. 3, 2015.
Intellectual Property Office of Singapore Written Opinion, dated Aug. 14, 2015.
Supplementary European Search Report, dated Sep. 21, 2015.
Australian Patent Examination Report No. 2, AU Application No. 2013249598 dated Jan. 25, 2016, 4 pages.
Karthikeyan, et al., Large Scale Synthesis of Carbon Nanotubes. E-Journal of Chemistry, 2009, 6(1), 1-12.
PCT International Search Report, dated Jul. 29, 2013, for PCT Application PCT/US13/35991, Filed Apr. 10, 2013.
Vander Wal, R.L.., et al., Flame Synthesis of Single-Walled Carbon Nanotubes and Nanofibers. Seventh International Workshop on Microgravity Combustion and Chemically Reacting Systems, Aug. 2003, 73-76 (NASA Research Publication: NASA/CP-2003-212376/REV1).
Written Opinion of the International Search Authority, dated Jul. 29, 2013, for PCT Application PCT/US13/35991, Filed Apr. 10, 2013.
Chinese Office Action, dated Oct. 19, 2015.
Japanese Non-Final Office Action, JP Application No. 2015-507053 dated Oct. 12, 2017, 3 pages.

* cited by examiner

200

300

1400

REMOVING CARBON NANOTUBES FROM A WATER SYSTEM

CROSS REFERENCE TO RELATED APPLICATIONS

Pursuant to 35 U.S.C. § 371, this application is a United States National Stage Application of International Patent Application No. PCT/US2013/035991, filed on 10 Apr. 2013, which claims priority based on U.S. Provisional Application Ser. No. 61/625,672, filed 18 Apr. 2012, titled "Removing Carbon Nanotubes from a Water Stream" the contents of which are incorporated by reference as if set forth in their entirety herein. The previous provisional applications are related to U.S. patent application Ser. No. 13/263,311 by Noyes and titled "Method for Producing Solid Carbon by Reducing Carbon Oxides," which was filed 6 Oct. 2011, which claims priority based on International Patent Application Number PCT/US2010/029934, by Noyes, entitled "Method for Producing Solid Carbon by Reducing Carbon Oxides," which was filed on 5 Apr. 2010, which in turn claims priority based on U.S. Provisional Patent Application Ser. No. 61/170,199 filed 17 Apr. 2009 and titled "Method for Producing Solid Carbon by Reducing Carbon Oxides," the disclosures of all of which are incorporated herein by this reference.

FIELD

The present techniques relate to an industrial scale process for purifying a water stream containing carbon nanotubes.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Materials formed predominately of solid or elemental carbon have been used in numerous products for many years. For example, carbon black is a high carbon content material used as a pigment and reinforcing compound in rubber and plastic products, such as car tires. Carbon black is usually formed by the incomplete thermal pyrolysis of hydrocarbons, such as methane or heavy aromatic oils.

Thermal blacks, formed by the pyrolysis of natural gas, include large unagglomerated particles, for example, in the range of 200-500 nm in size, among others. Furnace blacks, formed by the pyrolysis of heavy oils, include much smaller particles, in the range of 10-100 nm in size, that agglomerate or stick together to form structures. In both cases, the particles may be formed from layers of graphene sheets that have open ends or edges. Chemically, the open edges form reactive areas that can be used for absorption, bonding into matrices, and the like.

More recent forms of elemental carbon, such as fullerenes, have been developed, and are starting to be developed in commercial applications. In contrast to the more open structures of carbon black, fullerenes are formed from carbon in a closed graphene structure, i.e., in which the edges are bonded to other edges to form spheres, tubes, and the like. Two structures, carbon nanofibers and carbon nanotubes, have numerous potential applications, ranging from batteries and electronics to the use in concrete in the construction industry. Carbon nanomaterials may have a single wall of graphene or multiple nested walls of graphene or form a fiber structure from a stacked set of sheets in a cup or plate form. The ends of the carbon nanotubes are often capped with hemispherical structures, in a fullerene-like configuration. Unlike for carbon black, large scale production processes have not been implemented for carbon nanomaterials. However, research has been conducted on a number of proposed production processes.

Arc-based, laser-based ablation techniques and chemical vapor deposition have classically been used to generate carbon nanotubes from a carbon surface. For example, techniques for generating carbon nanotubes are reviewed in Karthikeyan, et al., "Large Scale Synthesis of Carbon Nanotubes," E-Journal of Chemistry, 2009, 6(1), 1-12. In one technique described, an electric arc is used to vaporize graphite from electrodes in the presence of metal catalysts, achieving production rates of about 1 gram/min. Another technique described uses laser ablation to vaporize carbon from a target electrode in an inert gas stream. However, the laser technique uses high purity graphite and high power lasers, but provides a low yield of carbon nanotubes, making it impractical for large scale synthesis. A third technique described by the authors, is based on chemical vapor deposition (CVD), in which a hydrocarbon is thermally decomposed in the presence of a catalyst. In some studies, these techniques have achieved production rates of up to a few kilograms/hour at a 70% purity level. However, none of the processes described are practical for large scale commercial production.

Hydrocarbon pyrolysis is used in the production of carbon black and various carbon nanotube and fullerene products. Various methods exist for creating and harvesting various forms of solid carbon through the pyrolysis of hydrocarbons using temperature, pressure, and the presence of a catalyst to govern the resulting solid carbon morphology. For example, Kauffman, et al., (U.S. Pat. No. 2,796,331) discloses a process for making fibrous carbon of various forms from hydrocarbons in the presence of surplus hydrogen using hydrogen sulfide as a catalyst, and methods for collecting the fibrous carbon on solid surfaces. Kauffman also claims the use of coke oven gas as the hydrocarbon source.

In another study, a flame based technique is described in Vander Wal, R. L., et al., "Flame Synthesis of Single-Walled Carbon Nanotubes and Nanofibers," Seventh International Workshop on Microgravity Combustion and Chemically Reacting Systems, August 2003, 73-76 (NASA Research Publication: NASA/CP-2003-212376/REV1). The technique used the introduction of a CO or $CO/C_2H_2$ mixture into a flame along with a catalyst to form the carbon nanotubes. The authors noted the high productivity that could be achieved using flame based techniques for the production of carbon black. However, the authors noted that scaling the flame synthesis presented numerous challenges. Specifically, the total time for catalyst particle formation, inception of the carbon nanotubes, and growth of the carbon nanotubes was limited to about 100 ms.

International Patent Application Publication WO/2010/120581, by Noyes, discloses a method for the production of various morphologies of solid carbon product by reducing carbon oxides with a reducing agent in the presence of a catalyst. The carbon oxides are typically either carbon monoxide or carbon dioxide. The reducing agent is typically either a hydrocarbon gas or hydrogen. The desired morphology of the solid carbon product may be controlled by the specific catalysts, reaction conditions and optional additives used in the reduction reaction.

While all of the techniques described above can be used to form carbon nanotubes, none of the processes provide a practical method for bulk or industrial scale production. Specifically, the amounts formed and the process efficiencies are both low. Furthermore, the techniques described above do not provide for the efficient separation and purification of water used for such a bulk or industrial scale production method.

SUMMARY

An embodiment described herein provides a method for removing carbon nanotubes from a water stream. The method includes flowing the water stream into a purification vessel, wherein the purification vessel is configured to form a carbon oxide from the carbon nanotubes within the water stream.

Another embodiment provides a system for removing carbon nanotubes from a water stream. The system includes a purification vessel, wherein the purification vessel is configured to form a carbon oxide from the carbon nanotubes within the water stream.

Another embodiment provides a method for purifying a water stream comprising carbon nanotubes. The method includes flowing the water stream into a purification vessel and injecting a chemical substance into the purification vessel. The method also includes effecting a separation of the carbon nanotubes from the water stream through an interaction of the chemical substance with the carbon nanotubes within the purification vessel.

DESCRIPTION OF THE DRAWINGS

The advantages of the present techniques are better understood by referring to the following detailed description and the attached drawings, in which.

DETAILED DESCRIPTION

Figure 1:
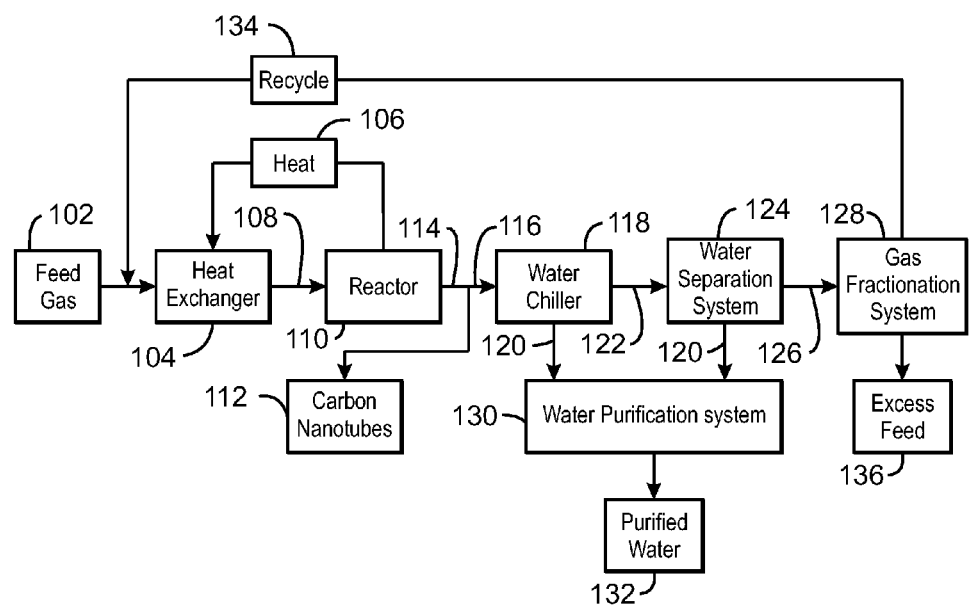
FIG. 1 is a block diagram of a reaction system that generates carbon structures, for example, as a by-product of a carbon dioxide sequestration reaction.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, "air sparging" is a water purification technique in which air is injected directly into water. The injected air may help to purify the water by volatizing contaminants within the water. The removal of the contaminants through physical contact with air is often called "stripping," and, thus, air sparging is sometimes referred to as "air stripping."

Carbon fibers, nanofibers, and nanotubes are allotropes of carbon that have a cylindrical structure, which can be in the nanometer range. Carbon nanofibers and nanotubes are members of the fullerene structural family, which includes the spherical carbon balls termed "Buckminster fullerene." The walls of the carbon nanotubes are formed from sheets of carbon in a graphene structure. As used herein, nanotubes may include single wall nanotubes and multiple wall nanotubes of any length. The term "carbon nanotubes" as used herein and in the claims, includes other allotropes of carbon, such as carbon fibers, carbon nanofibers, and other carbon nanostructures.

A "compressor" is a device for compressing a working gas, including gas-vapor mixtures or exhaust gases, and includes pumps, compressor turbines, reciprocating compressors, piston compressors, rotary vane or screw compressors, and devices and combinations capable of compressing a working gas. In some embodiments, a particular type of compressor, such as a compressor turbine, may be preferred. A piston compressor may be used herein to include a screw compressor, rotary vane compressor, and the like.

"Flocculation" is a process wherein colloids are brought out of suspension in the form of "floc" or "flakes" through the addition of a clarifying agent. Flocculation may result in the aggregation of small particles into larger particles. Other types of flocculation may include adding solvents configured to trap substances or particles from one phase and move them to another phase. For example, counter current flow of an organic solvent through a water solution may be useful for removing hydrophobic particles from the water solution, as described herein.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in natural gas, oil, or chemical processing facilities.

"Incineration" is a waste treatment process that involves the combustion of organic substances contained in waste materials. The incineration of the waste material converts the waste material into ash, flue gas, and heat.

As used herein, the term "natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide), or any combination thereof. The natural gas can also contain minor amounts of contaminants such as water, nitrogen, iron sulfide, wax, crude oil, or any combination thereof. The natural gas stream may be substantially purified prior to use in embodiments, so as to remove compounds that may act as poisons.

A "low-BTU natural gas" is a gas that includes a substantial proportion of $CO_2$ as harvested from a reservoir. For example, a low BTU natural gas may include 10 mol % or higher $CO_2$ in addition to hydrocarbons and other components. In some cases, the low BTU natural gas may include mostly $CO_2$.

"Oxidation" is a reaction in which atoms in an element lose electrons, and the valence of the element is correspondingly increased. As used herein, the term "oxidation" may refer to a chemical oxidation process used for water purification. Oxidation may help to reduce the concentrations of contaminants within water through the introduction of strong chemical oxidizers directly into the contaminated water to destroy the contaminants. It can also be used to remediate a variety of organic compounds.

"Ozonolysis" is a reaction in which an alkene or alkyne cleaves with ozone to form organic compounds. The multiple carbon-carbon bonds in the resulting organic compounds are replaced by double bonds to oxygen.

As used herein, a "plant" is an ensemble of physical equipment in which chemical or energy products are processed or transported. In its broadest sense, the term plant is applied to any equipment that may be used to produce energy or form a chemical product. Examples of facilities include polymerization plants, carbon black plants, natural gas plants, and power plants.

"Reverse osmosis" is a process by which a solvent such as water is purified of solutes by being forced through a semipermeable membrane through which the solvent, but not the solutes, may pass. In many cases, reverse osmosis is initiated by the application of pressure to the solution, which forces the solvent to pass through the semipermeable membrane.

A "thickening agent," or "thickener," is a substance that increases the viscosity of a liquid/solid mixture without substantially modifying its other properties. A thickening agent may also be referred to as a "gelling agent" or a "solidifier." The thickening agent may result in the formation of a gel-like material that can be removed from the surface of a liquid by skimming, or through the use of suction devices or nets.

Overview

Embodiments described herein provide a system and methods for removing carbon nanotubes from a water stream. The water stream may be waste water from a process for creating the carbon nanotubes. The carbon nanotubes may be removed from the water stream in order to obtain a purified water stream. In addition, in some embodiments, a carbon nanotube product may be obtained from the carbon nanotubes. It can be noted that the techniques described herein are not limited to carbon nanotubes (CNTs). Other carbon allotropes, such as carbon nanofibers, carbon black, and the like, may be removed from water streams using the current techniques. Accordingly, references to CNTs can be understood to apply to these carbon allotropes as well.

In various embodiments, the CNTs may be removed by the formation of a carbon oxide from the CNTs within a purification vessel. The carbon oxide may be, for example, carbon monoxide or carbon dioxide. The carbon oxide may be formed as a result of an interaction between the CNTs and, for example, an oxidizing agent, or ozone. The carbon oxide may also be formed by the incineration of the CNTs. In some embodiments, the CNTs may be removed from the water stream through an air sparging process, which may or may not result in the production of carbon oxides.

Further, in some embodiments, the CNTs may be removed from the water stream through an interaction with any of a number of different types of chemical substances. For example, a flocculant may be injected into the water stream and used to effect the removal of the CNTs by causing the contaminants to agglomerate. A thickening agent may be injected into the water stream and used to effect the removal of the CNTs by causing the contaminants to float to the surface of the water stream.

In some embodiments, a reverse osmosis process may be used to remove the CNTs from the water stream. In the reverse osmosis process, pure water within the water stream can be forced through a semipermeable membrane due to an application of pressure, removing the CNTs from the water stream. A settling process may also be used to remove the CNTs from the water stream within, for example, a tank, or settling pond. Further, in some embodiments, techniques based on centripetal force may be used to effect the separation, such as a hydrocyclone, a multihydrocyclone, or a centrifuge.

According to embodiments described herein, the CNTs may be removed from the water stream according to any type of suitable separation process. In addition, any number of the techniques described above may be used in conjunction with one another to increase the degree of purification of the water stream.

Embodiments described herein provide a system and methods for purifying a waste water stream formed while making carbon fibers, carbon nanofibers, and CNTs (CNTs) on an industrial scale. The process is conducted under high temperature and pressure conditions using a Bosch reaction or a Bosch-like reverse degasification reaction, as discussed with respect to FIG. 2.

The process may be slightly exothermic, energy neutral, or slightly endothermic. Accordingly, at least a portion of the heat from the reaction can be recovered and used to heat the feed gases, providing a portion of the heat used by the process during continuous operations. As a high pressure process is used, an ambient temperature heat exchanger is sufficient for the removal of water vapor from the product stream, without using cryogenic coolers. While the process upstream may have separation devices such as cyclones or filters, for example, the condensation of the water vapor may result in some contamination of the water stream with residual CNTs.

As used herein, an ambient temperature heat exchanger can include water chillers, air coolers, or any other cooling system that exchanges heat with a source that is at substantially ambient temperature. It can be understood that ambient temperature is substantially the temperature of the outside air at the location of the facility, e.g., ranging from about −40° C. to about +40° C., depending on the location of the facility. Further, different types of ambient temperature heat exchangers may be used depending on current ambient temperature. For example, a facility that uses water chillers in a summer season may use air coolers in a winter season. It can be understood that an appropriate type of heat exchanger may be used at any point herein that describes the use of an ambient temperature heat exchanger. The ambient temperature heat exchangers may vary in type across the plant depending on the amount of cooling needed.

In some embodiments described, industrial quantities of carbon products such as fullerenes, CNTs, carbon nanofibers, carbon fibers, graphite, carbon black, and graphene, among others, can be produced using carbon oxides as the primary carbon source. The balance of the possible products may be adjusted by the conditions used for the reaction, including catalyst compositions, temperatures, pressures, feedstocks, and the like. In a reactor system, the carbon oxides are catalytically converted to solid carbon and water. The carbon oxides may be obtained from numerous sources, including the atmosphere, combustion gases, process off-gases, well gases, and other natural and industrial sources.

The present process can use various feedstocks, including for example, a carbon oxide, e.g., carbon dioxide ($CO_2$) or carbon monoxide (CO), and a reducing agent, e.g., methane ($CH_4$) or other hydrocarbons, hydrogen ($H_2$), or any combinations thereof. The reducing agent may include other hydrocarbon gases, hydrogen ($H_2$), or mixtures thereof. A hydrocarbon gas can act as both an additional carbon source and as the reducing agent for the carbon oxides. Other gases, such as syngas, may be created as intermediate compounds in the process or may be contained in the feed. These gases can also be used as the reducing agent. Syngas, or "synthetic gas," includes carbon monoxide (CO) and hydrogen ($H_2$) and, thus, includes both the carbon oxide and the reducing gas in a single mixture. Syngas may be used as all or a portion of the feed gas.

Carbon oxides, particularly carbon dioxide, are abundant gases that may be extracted from exhaust gases, low-BTU well gas, and from some process off-gases. Although carbon dioxide may also be extracted from the air, other sources often have much higher concentrations and are more economical sources from which to harvest the carbon dioxide. Further, carbon dioxide is available as a by-product of power generation. The use of $CO_2$ from these sources may lower the emission of carbon dioxide by converting a portion of the $CO_2$ into carbon products.

The systems described herein may be incorporated into power production and industrial processes for the sequestration of carbon oxides, allowing their conversion to solid carbon products. For example, the carbon oxides generated in combustion or process off-gases may be separated and concentrated to become a feedstock for this process. In some cases, these methods may be incorporated directly into the process flow without separation and concentration, for example as an intermediate step in a multi-stage gas turbine power station. In other embodiments, the systems may be incorporated into waste processing systems used to form CNTs from carbonaceous feedstocks.

As used herein, an industrial scale process may provide large quantities of carbon allotropes in short periods of time. For example, the techniques used herein may provide carbon allotropes in quantities greater than about 0.5 Kg/hr, greater than about 1 Kg/hr, greater than about 2 Kg/hr, greater than about 5 Kg/hr, greater than about 10 Kg/hr, greater than about 100 Kg/hr, or greater than 1000 Kg/hr. The amounts produced depend on the scale of the equipment and the catalysts chosen.

FIG. 1 is a block diagram of a reaction system 100 that generates carbon structures, for example, as a by-product of a carbon dioxide sequestration reaction. The reaction system 100 is provided a feed gas 102, which can be a mixture of $CO_2$ and $CH_4$. In some embodiments, the reaction may allow for sequestration of $CO_2$ from exhaust streams of power plants and the like. In other embodiments, the $CH_4$ is at a higher concentration, for example, in a gas stream from a natural gas field. Other components may be present in the feed gas 102, such as $C_2H_6$, $C_2H_4$, and the like. In one embodiment, the feed gas 102 has been treated to remove these components, for example, for sale as product streams.

The feed gas 102 is passed through a heat exchanger 104 to be heated for reaction. During continuous operation, a portion of the heating is provided using heat 106 recovered from the reaction. The remaining heat for the reaction may be provided by an auxiliary heater, as described below. During start-up, the auxiliary heater is used to provide the total heat to bring the feed to the appropriate reaction temperature, e.g., about 500° C. (about 930° F.). In one embodiment, the feed is heated to between about 500° C. (about 932° F.) to about 550° C. (about 1022° F.). In another embodiment, the feed is heated to between about 700° C. (about 1292° F.) to about 750° C. (about 1382° F.). In another embodiment, the feed is heated to between about 800° C. (about 1472° F.) to about 850° C. (about 1562° F.). The heated feed gas 108 is fed to a reactor 110.

In the reactor 110, a catalyst reacts with a portion of the heated feed gas 108 to form CNTs 112 using the Bosch reaction. As described in more detail below, the reactor 110 can be a fluidized bed reactor that uses any number of different catalysts, including, for example, metal shot, supported catalysts, and the like. The CNTs 112 are separated from the flow stream 114 out of the reactor 110, leaving a waste gas stream 116 containing excess reagents and water vapor. At least a portion of the heat from the flow stream 114 is used to form the heated feed gas 108 prior to the flow stream 114 entering the chiller as the waste gas stream 116.

The waste gas stream 116 is passed through an ambient temperature heat exchanger, such as water chiller 118, which condenses out some amount of the water 120 within the waste gas stream 116. The partially dried waste gas stream 122 may then be passed to a water separation system 124, which may separate most of the remaining water 120 from the partially dried waste gas stream 122. The resulting dry waste gas stream 126 is used as a feed stream for a gas fractionation system 128. It can be understood that a dry waste gas stream, as used herein, has the bulk of the water removed, but may still have small amounts of water vapor. For example, the dew point of a dry waste gas stream may be greater than about −5° C., greater than about 0° C., greater than about 5° C., greater than about 10° C., greater than about 20° C., or higher. A dryer may be used to lower the dewpoint, for example, to about −50° C., about −70° C., or lower, prior to gas fractionation.

The water 120 that is condensed and removed from the waste gas stream 116 and the partially dried waste gas stream 122 may contain CNTs that have were not removed in the separation process. Accordingly, the water 120 can be fed into a water purification system 130. The water purification system 130 may be configured to generate a purified water stream 132 by removing CNTs and other impurities from the water 120.

The water purification system 130 may include any of a number of devices that are configured to effect the separation of the CNTs from the purified water stream 132. In some embodiments, the water purification system 130 is configured to form a carbon oxide from the CNTs within the water 120. This may be accomplished by, for example, the incineration of the water 120, the mixing of the water 120 with ozone, or the mixing of the water 120 with an oxidizing agent. Some portion of the steam from an incineration process may then be condensed within a heat exchanger to form the purified water stream 132. An underwater burner or a flame degradation vessel, among others, may be used to incinerate the CNTs in the water 120.

Further, in some embodiments, the separation of the CNTs from the water 120 may be effected within an air sparge. An injection of air into the water 120 within the air sparge may cause the CNTs to float to the surface of the water 120 in a froth phase, and the CNTs may then be drained from the water 120 over the top of a weir.

In some embodiments, the CNTs may be separated from the water 120 through a reverse osmosis process, in which the purified water stream 132 is forced to pass through a semipermeable membrane that is impermeable to the CNTs. The purified water stream 132 may also be generated using centripetal force to separate CNTs, for example, in a hydrocyclone, in a multihydrocyclone, or in a centrifuge. In addition, molecular sieves or a zeolite bed may be used to remove the CNTs from the water 120.

In some embodiments, the water separation and purification process may be accomplished within the water chiller 118. For example, a flocculant, an oxidizing agent, a thickening agent, ozone, or any number of other chemical substances may be used to effect the separation of the CNTs within the water chiller 118.

In some embodiments, the gas fractionation system 128 removes a portion of the reagent having the lower concentration in the feed gas 102 and recycles it to the process, for example, by blending a recycle stream 134 with the feed gas 102. The higher concentration gas in the feed gas 102 can be disposed of as excess feed 136, for example, by sales to downstream users. As an example, if $CO_2$ is the highest concentration gas in a blend with $CH_4$, the gas fractionation system 128 can be used to remove $CH_4$ remaining in the waste gas stream, and send it back into the process as the recycle stream 134. The process functions as an equilibrium reaction between the reagents and solid carbon, as discussed further with respect to FIG. 2. The gas fractionation system 128 may not be utilized when the $CH_4$ is in excess, as much of the $CO_2$ may be consumed in the reaction. Thus, the excess feed 136 that contains the $CH_4$, and which may also contain $H_2$, CO, and other gases, may be used to generate power in a power plant, or may be used as fuel for another purpose, without further purification or gas separation.

Figure 2:
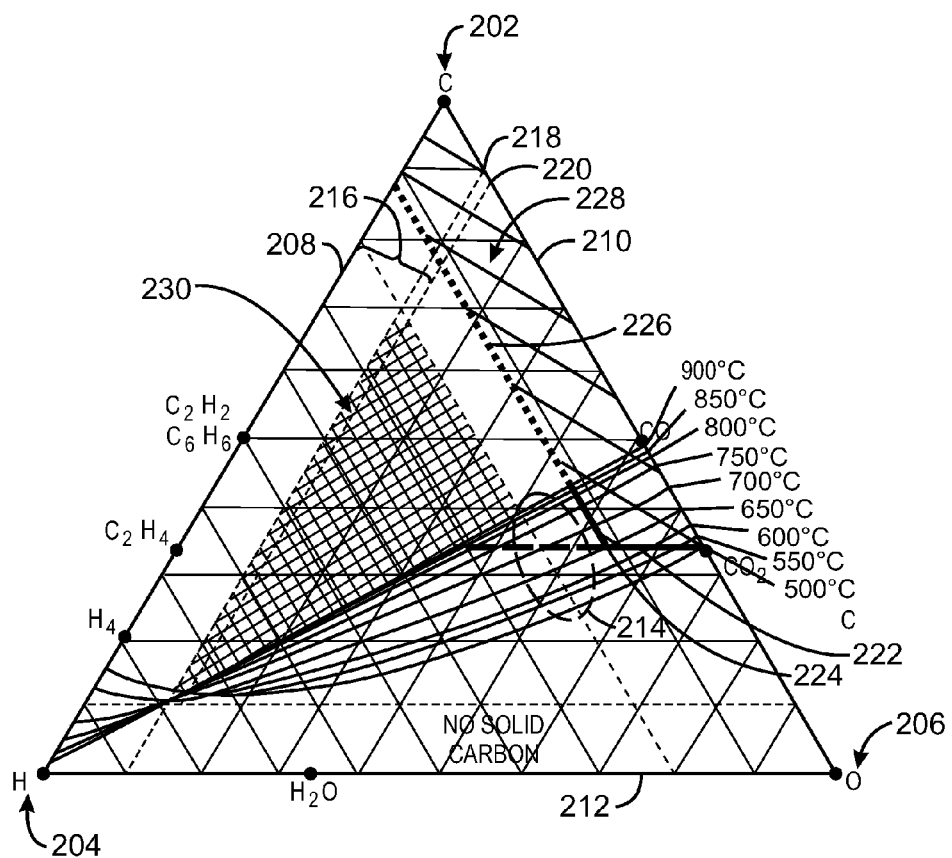
FIG. 2 is an equilibrium diagram that identifies conditions under which a solid carbon product will form.

FIG. 2 is an equilibrium diagram that identifies conditions under which a solid carbon product will form. This diagram is a triangular diagram 200 with the elements, C 202, H 204, and O 206, at the apexes of the triangle. As one moves from any location towards an apex the molar ratio of the element, C 202, H 204, and O 206, increases. In this way all of the possible compositions of the three elements can be mapped onto the triangular diagram 200.

Any chemical compound, or mixture, with any two or all these three elements can be mapped onto the triangular diagram 200 as indicated by the exemplary points marked. Some of the chemical compounds include hydrocarbons such as alkanes, alkenes, and alkynes, as well as many other types of hydrocarbons. The hydrocarbons are located on the C—H edge 208 connecting C 202 and H 204. Chemical compounds that include only the elements C 202 and O 206, including carbon monoxide (CO) and carbon dioxide ($CO_2$), occur along the C—O edge 210 connecting C 202 and O 206. Chemical compounds that include only the elements H 204 and O 206, such as water ($H_2O$), occur along the H—O edge 212 connecting H 204 and O 206.

In the central region of the triangular diagram 200 are chemical compounds and mixtures that have all three elements, C 202, H 204, and O 206. For example, these chemical compounds may include a very large number of individual components, such as alcohols, aldehydes, ethers, and materials with more complex structures, such as carbohydrates. Further, mixtures of compounds such as hydrogen, carbon oxides, and hydrocarbons may also be present.

Some of the first experiments to form fullerenes, $C_{60}$ and $C_{70}$, as well as carbon nanotubes (CNTs) were performed by laser ablation of a carbon electrode, capturing the carbon material in a mass spectrometer. The curves 214 shown in FIG. 2 show the limit of carbon production at various temperatures. These curves 214 were determined by performing a stoichiometrically constrained Gibbs minimization, which minimizes the Gibbs free energy of the resulting compounds based on the constraint that the amount of carbon, oxygen, and hydrogen are to be the same both before and after the reaction. The point where solid carbon formation occurs for the first time was noted as the composition was moved from a first composition point to a second composition point on the triangular diagram 200.

In thermodynamic terms, the curves 214 identify the points where the activity of carbon is about 1.0. Above a carbon activity of about 1.0, solid carbon forms in the center region, while below the carbon activity of about 1.0, no solid carbon forms. The triangular diagram 200 is useful for identifying the conditions where carbon allotropes, such as carbon nanotubes (CNTs) can possibly be produced, as well as determining compounds and mixtures that can be used for their production.

At the temperatures indicated in FIG. 2, most hydrocarbons, and other organic compounds, undergo thermal decomposition to produce small, thermodynamically stable, gas molecules, such as CO, $CO_2$, $CH_4$, $H_2O$, $H_2$, and the like. Under certain reaction conditions, these small gas molecules can react to produce carbon allotropes. In some cases, the carbon allotropes will be in the form of CNTs. Both single walled and multi-walled CNTs of various dimensions and chiralities can be made in these ways.

Reaction Pathways for the Formation of Carbon Allotropes

Hydrocarbons undergo thermal decomposition in two ways, depending upon the concentration of oxygen. Without oxygen being present, large hydrocarbon molecules will thermally decompose into smaller hydrocarbons, such as methane, ethane, propane, and hydrogen. These small hydrocarbons will further decompose to carbon and more hydrogen, giving an overall reaction as shown in Rxn. 1. This reaction, termed a pyrolysis reaction, occurs along the C—H edge 208.

$$C_nH_{2m} \leftrightarrow nC + mH_2 \qquad \text{Rxn. 1}$$

A representative case is the thermal decomposition of methane, shown in Rxn. 2.

$$CH_4 \leftrightarrow C + 2H_2 \qquad \text{Rxn. 2}$$

In the presence of a low amount of oxygen, hydrocarbons will react to form carbon monoxide and carbon dioxide and water as well as carbon allotropes and hydrogen according to the reaction shown in Rxn. 3. This reaction is termed the Bosch reaction, and occurs in the center region of the triangular diagram 200.

$$C_nH_{2m} + qO_2 \leftrightarrow qCO + qH_2O + (n-q)C + (m-q)H_2 \qquad \text{Rxn. 3}$$

The ratio of CO to $H_2O$ after reaction may differ depending upon the temperature of the system. Further, depending upon the amount of oxygen in the system, there may be some carbon dioxide in the product gases. Any carbon monoxide or carbon dioxide produced may react to form carbon allotropes at the high temperature conditions. Higher concentrations of $O_2$ typically results in higher temperatures, due to combustion, resulting in the production of more CO and $CO_2$ and less solid carbon and hydrogen. Thus, the reaction system must restrict the amount of oxygen present in the system in order to produce larger amounts of carbon allotropes.

Organic compounds that include small amounts of oxygen may also be useful in the production of carbon allotropes. These compounds thermally decompose to form small, thermodynamically stable, gas molecules which can further react on a catalyst surface to produce carbon allotropes and water according to the overall reaction shown in Rxn. 4, which is another example of the Bosch reaction.

$$C_nH_{2m}O_q \leftrightarrow nC + qH_2O + (m-q)H_2 \qquad \text{Rxn. 4}$$

Any carbon monoxide or carbon dioxide produced has a tendency to react to carbon at these high-temperature conditions, adding to the overall productivity. These reactions form the simplest embodiments of the Bosch reaction, shown in Rxn. 5.

$$CO_2 + 2H_2 \leftrightarrow C + 2H_2O \qquad \text{Rxn. 5}$$

The Bosch reaction can be mechanistically written as two separate reactions in which CO is produced as an intermediate, as shown in Rxns. 6 and 7.

$$CO_2 + H_2 \leftrightarrow C + H_2O \qquad \text{Rxn. 6}$$

$$CO + H_2 \leftrightarrow C + H_2O \qquad \text{Rxn. 7}$$

The first, Rxn. 6, is fast and tends toward equilibrium. The second, Rxn. 7, is slow. Another reaction that can produce carbon allotropes is the Boudouard reaction that is shown in Rxn. 8. The Boudouard reaction takes place on the C—O edge 210, and produces carbon allotropes and carbon dioxide from carbon monoxide.

$$2CO \leftrightarrow C + CO_2 \qquad \text{Rxn. 8}$$

In addition to forming small molecules directly in the reactor, a number of other approaches may be used to provide the reactants to form the carbon allotropes. For example, steam reforming of hydrocarbons and other organic chemicals may be used. In these reactions, shown in Rxns. 9 and 10, a mixture of CO and hydrogen, called syngas, is formed.

$$C_nH_{2n} + nH_2O \leftrightarrow nCO + (m+n)H_2 \qquad \text{Rxn. 9}$$

$$C_nH_{2m}O_q + (n-q)H_2O \leftrightarrow nCO + (m+n-q)H_2 \qquad \text{Rxn. 10}$$

At the reaction temperatures shown in the triangular diagram 200, the syngas forms carbon allotropes via the second step of the Bosch reaction mechanism, shown in Rxn. 7.

As is apparent in the reactions shown above, there is a multitude of starting points for the production of carbon allotropes, such as CNTs. However, the reactions can be simplified by focusing on the conversion of the feedstock compounds into a mixture of small, thermodynamically stable, gases. These gases can then react to form carbon allotropes in the presence of a catalyst. This simplification can be performed by noting that a given hydrocarbon reacting with oxygen or with steam will be converted to carbon monoxide, carbon dioxide, water vapor, and hydrogen. Similarly, a given oxygenate reacting with itself, or with oxygen or steam, will also be converted to carbon monoxide, carbon dioxide, water vapor, and hydrogen. The ultimate mixture of small thermodynamically stable gases can be determined by performing equilibrium calculations on the reactions described above.

The gas mixture can then be converted to carbon allotropes in the Boudouard Reaction shown in Rxn. 8, step two of the Bosch reaction shown in Rxn. 7, the methane pyrolysis reaction shown in Rxn. 2, or some combinations of these. As all of these reactions produce carbon allotropes, they may be used to predict the carbon activity as a function of the composition of carbon monoxide, carbon dioxide, hydrogen, water vapor, methane, or the like, which are produced by some previous thermal decomposition reaction.

Oxidation Poisoning of Metal Catalysts

Another aspect of the catalytic reaction to produce carbon allotropes is that certain gas compositions and temperatures will oxidize the metal catalyst used in the reaction, rendering it ineffective for further catalytic reaction, as shown in Rxn. 11. The point where oxygen causes a metal or alloy to oxidize depends upon its properties. For elemental metals, this is determined by the Gibbs free energy of formation of the oxide.

$$xM + yO_2 \leftrightarrow M_xO_{2y} \qquad \text{Rxn. 11}$$

If a catalyst includes iron, there are various oxides that may be formed. The most common include Wüstite (FeO), magnetite ($Fe_3O_4$), and hematite ($Fe_2O_3$). Wüstite is thermodynamically favored at the temperatures and pressures shown in FIG. 2 and forms by the reaction shown in Rxn. 12.

$$Fe + \tfrac{1}{2}O_2 \leftrightarrow FeO \qquad \text{Rxn. 12}$$

An equilibrium constant, $K_{FeO}$, for Rxn 12 can be determined by the formula shown in Eqn. 4.

$$K_{FeO} = \exp[-\Delta G_{FeO}/(R_g T)] = [P_{O_2}/P_T]^{-1/2} \qquad \text{Eqn. 4}$$

In Eqn. 4, $\Delta G_{FEO}$ is the Gibbs free energy of iron oxidation to Wüstite which is a function of temperature, $R_g$ is the gas constant, T is the absolute temperature, $P_{O_2}$ is the partial pressure of oxygen ($O_2$), and $P_T$ is the total pressure of the system. The ratio, $P_{O_2}/P_T$, is simply the mole fraction of $O_2$ in the system. Using this equation, the partial pressure of oxygen that will initiate the oxidation of iron at any temperature can be identified.

The partial pressure of oxygen can be obtained from one of the fast reaction equilibria presented in Eqns. 5 and 6.

$$H_2O \leftrightarrow H_2 + \frac{1}{2}O_2,$$ Eqn. 5

$$P_{O2} = P_T \sqrt{K_{H2O} \frac{Y_{H2O}}{Y_{H2}}}$$

$$CO_2 \leftrightarrow CO + \frac{1}{2}O_2,$$ Eqn. 6

$$P_{O2} = P_T \sqrt{K_{CO2} \frac{Y_{CO2}}{Y_{CO}}}$$

In these equilibria calculations, $K_i$ is the equilibrium constant, a function of temperature, for the decomposition of gas i. As shown by Eqns. 5 and 6, the partial pressure of oxygen is controlled by either the mole fraction ratio of water vapor to hydrogen or the mole fraction ratio of carbon dioxide to carbon monoxide at a given temperature.

As shown in Eqns. 1-6, the mole fraction ratios are important in the determination of the partial pressure of oxygen and in the definition of carbon activity for the Boudouard and Bosch reaction mechanisms. For example, the mole fraction ratio sets both the carbon activity and the partial pressure of oxygen, so that there will be a given activity of carbon that will initiate the oxidation of the metal catalyst.

As the pyrolysis reactions are endothermic, their zone of influence is near the H 204 apex of the triangular diagram 200, where the temperature lines curve, inverting the temperature sequence as the amount of carbon in the system increases. As a result, a zone 216 near the C—H edge 208 may be delineated in the triangle near the H apex, where pyrolysis reactions dominate over Bosch reactions. As the transition point changes as the temperature of the system changes, two lines 218 and 220 can be used to indicate the edge of the zone 216, depending on the temperature. The first line 218 delineates the zone 216 at about 1173.45 K (about 900° C.), while the second line 220 delineates the zone 216 at about 973.15 K (about 700° C.). The pyrolysis reactions dominate over the Bosch reactions in the zone between either of the lines 218 or 220 and the C—H edge 208.

Further, from the Ac produced by both the Bosch second step and the Boudouard reactions, a zone near the C—O edge 210 can be identified at which there is an equal probability for the first solid carbon allotropes to be produced by either reaction, based on the thermodynamics. One edge of this zone can be delineated by a first line 222 in the triangle diagram 200. Further, as discussed above, there is a point at which the second step of the Bosch reaction generates sufficient water to cause the partial pressure of oxygen to be sufficiently high that the iron catalyst will oxidize to Wüstite. At this point 224 the first line 222 becomes dotted and a second line 226, at a fixed hydrogen (H) content of about 0.14 for FeO, limits the Boudouard zone at about 1 atm system pressure. The Boudouard zone 228 dominates over the Bosch reaction at reaction conditions above and to the right of the first line 222 and to the right of the second line 222 (FeO oxidation).

Conclusion

The calculations discussed with respect to FIG. 2 identify carbon activity as the driving force for the production of carbon allotropes, such as CNTs. Thus, various reaction mixtures in the C—H—O system can be reduced to a prediction of the carbon activity using three carbon forming reactions that are applicable on the C—H edge 208, C—O edge 210, and the central portion of the triangular diagram of the C—H—O system. Carbon activities larger than about 1.0 produces carbon by each of the three carbon forming reactions. In some cases the carbon activity is a predictor of the transformation of iron to Wüstite, FeO. In these cases, the carbon activity where iron oxidizes will limit the carbon activity range where carbon can form to values larger than about 1.0. In the case of the Bosch second step reaction with equimolar CO:$H_2$ feed at about 973.15 K (about 700° C.) the carbon activity is limited to values larger than about 35 for example.

Further, the calculations show clearly delineated zones where pyrolysis (zone 216) and Boudouard reactions (zone 228) dominate on the C—H edge 208 and C—O edge 210, respectively, of the triangular diagram 200. This also shows that experimental conditions in the central part of the triangular diagram of the C—H—O system define a Bosch reaction region 230 that provides the largest reactor conversion resulting in faster production and higher yields than reactions on the C—H edge 208 or C—O edge 210 of the triangular diagram 200. In this region, the concentration of the carbon is set by the Ac, and is greater than about 10%. Further, the oxygen content is greater than about 10%, and the hydrogen concentration is greater than about 20%.

Reactor Systems

Figure 3:
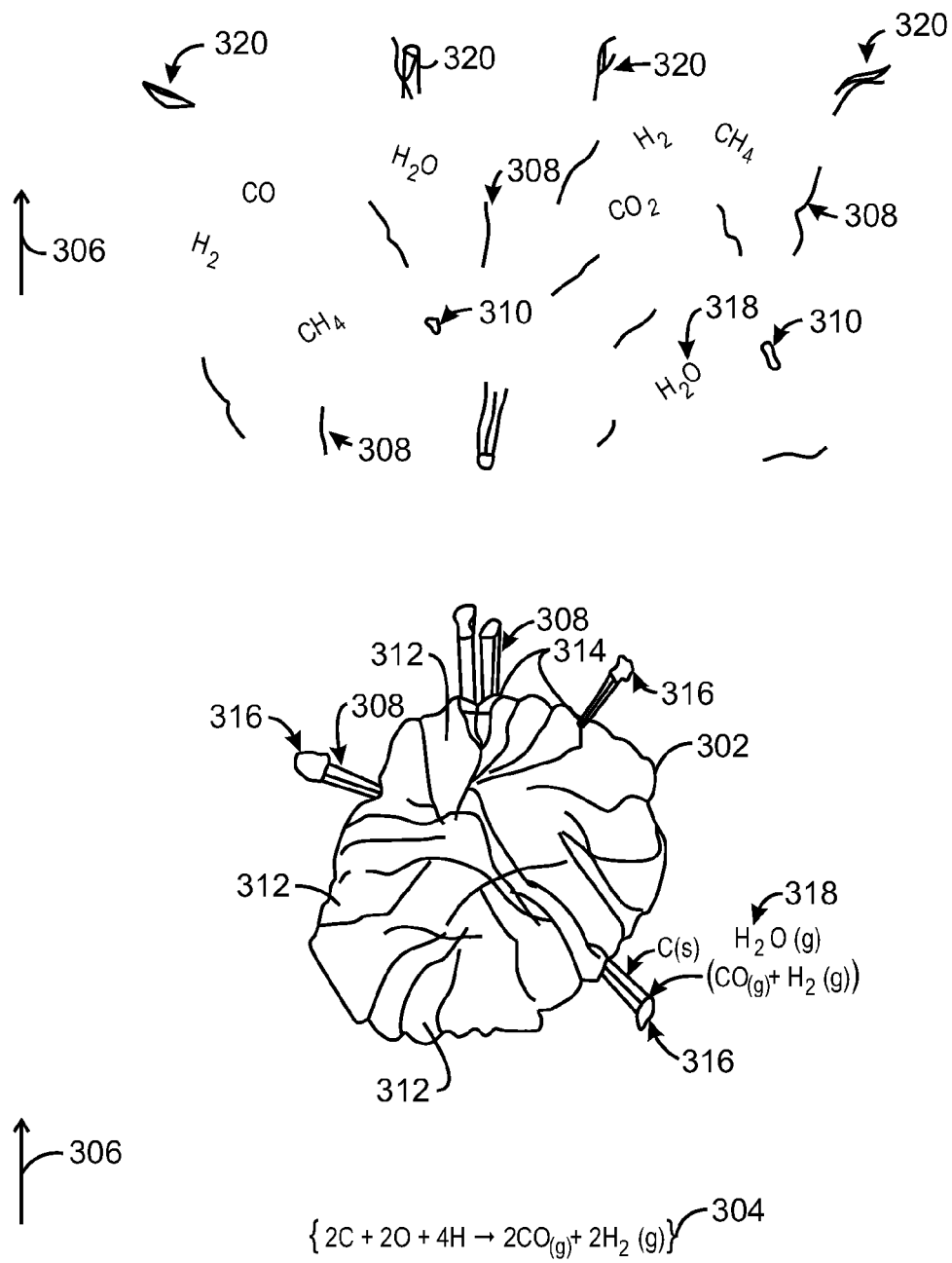
FIG. 3 is a schematic of a catalytic reaction for the formation of carbon nanotubes (CNTs) on a catalyst particle.

FIG. 3 is a schematic of a catalytic reaction 300 for the formation of CNTs on a catalyst particle 302. An initial reaction 304 between a portion of the compounds in the hot gas feed stream 306, for example, $CH_4$ and the CO2, results in the formation of CO and $H_2$ in stoichiometric amounts. Excess amounts of the source gases 306 continue to flow through the reactor, helping to fluidize the bed and carrying away CNTs 308 and catalyst particles 310.

The reactions that form the CNTs 308 take place on the catalyst particle 302. The size of the CNTs 308, and the type of CNTs 308, e.g., single wall or multiwall CNTs 308, may be controlled by the size of the grains 312. Without being limited by theory, a nucleus of iron atoms of sufficient size at the grain boundary may form the nucleating point for the growth of the carbon products on the catalyst particle 302. Generally, smaller grains 312 will result in fewer layers in the CNTs 308, and may be used to obtain single wall CNTs 308. Other parameters may be used to affect the morphology of the final product as well, including reaction temperature, pressure, and feed gas flow rates.

The CO and $H_2$ can react at grain boundaries 314, lifting active catalyst particles 316 off the catalyst particle 302, and forming $H_2O$ 318 and the solid carbon of the CNTs 308. The CNTs 308 break off from the catalyst particle 302 and from the catalyst particle 1010. Larger catalyst particles 310 can be captured and returned to the reactor, for example, by a catalyst separator discussed further with respect to FIG. 4, while very fine catalyst particles 310 will be carried out with the CNTs 308. The final product will include about 70 mol % solid carbon and about 15 mol % metal, about 80 mol % solid carbon and about 10 mol % metal, about 90 mol % solid carbon and about 7 mol % metal, or about 95 mol % solid carbon and about 5 mol % metal. The CNTs 308 will often agglomerate to form clusters 320, which are the common form of the final product. Some amount of the CO and $H_2$ passes through the reactor without reacting and are contaminants in the reactor effluent streams, e.g., causing degradation reactions in downstream equipment.

As the reaction proceeds, the catalyst particle 302 is degraded and finally consumed. Accordingly, the reaction may be described as a metal dusting reaction. In some embodiments, metal surfaces in the reactor and downstream equipment are protected from attack by a protective lining, e.g., a ceramic or gold lining, since the metal surfaces in contact with the reaction conditions would not only degrade, but may also result in the formation of poorer quality products.

The catalyst particle 302 any number of metals from different IUPAC Groups on the periodic table, such as Group 10 (e.g., nickel), Group 8 (e.g., iron or ruthenium), Group 9 (e.g., cobalt), or Group 6 (e.g., chromium or molybdenum), among others. Other metals that may be present include Group 7 metals (e.g., manganese), or Group 5 metals (e.g., cobalt), among others. It can be understood that the metals listed above are merely exemplary of the Groups mentioned and other metals from those Groups may be included. However, the catalytic sites on the catalyst particles 302 are principally composed of iron atoms. In one embodiment, the catalyst particle 302 includes metal shot, for example, about 25-50 mesh metal beads that are used for shot blasting. In one embodiment, the catalyst may be a stainless ball bearing, and the like.

The $H_2O$ 318 that is created according to the catalytic reaction 300 may be substantially mixed with the CNTs 308, the catalyst particles 310, and the clusters 320. According to embodiments described herein, the $H_2O$ 318 may be separated from these impurities through a purification process. The purification process may be implemented within the reactor systems discussed further with respect to FIGS. 5 and 6.

Figure 4:
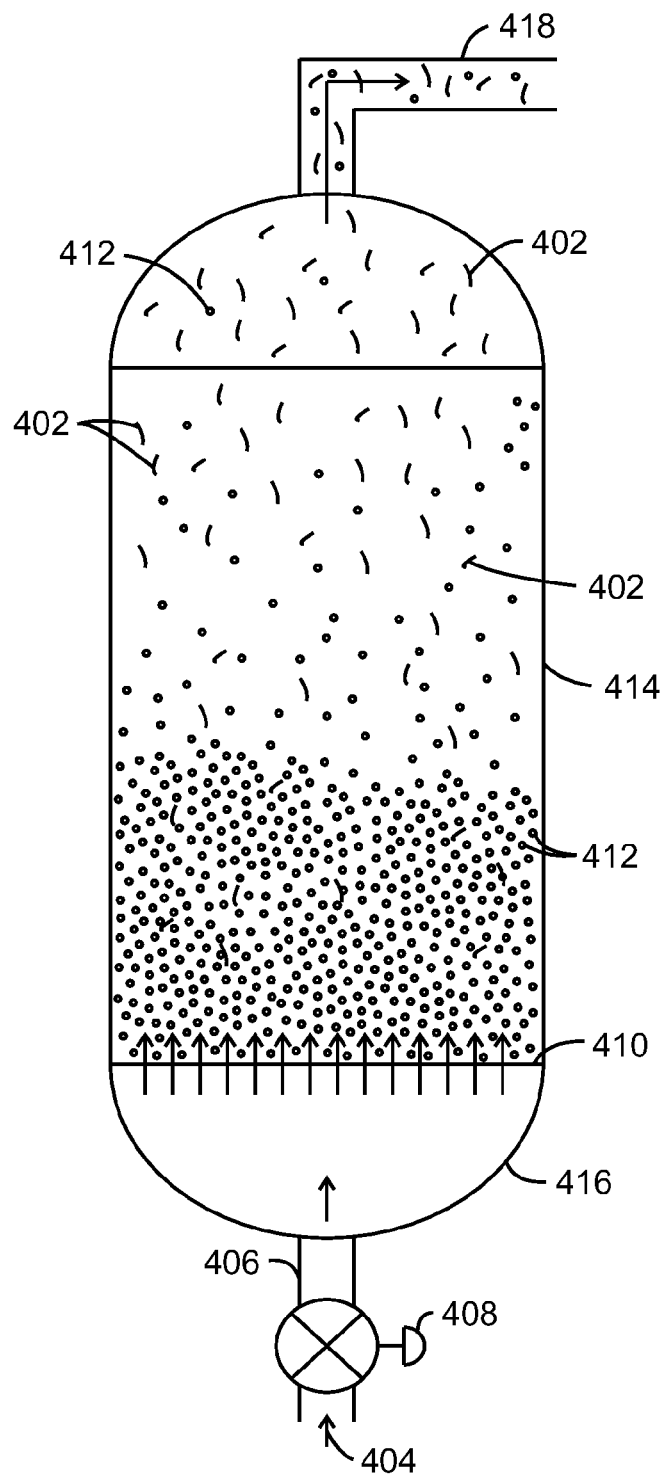
FIG. 4 is a drawing of a fluidized bed reactor for forming CNTs.

FIG. 4 is a drawing of a fluidized bed reactor 400 for forming CNTs 402. A hot gas feed stream 404 is fed through a line 406 into the bottom of the fluidized bed reactor 400. A control valve 408 may be used to regulate the flow of the hot gas feed stream 404 into the fluidized bed reactor 400. The hot gas feed stream 404 flows through a distributor plate 410 and will fluidize a bed of catalyst particles 412 held in place by the reactor walls 414. As used herein, "fluidize" means that the catalyst particles 412 will flow around each other to let gas bubbles through, providing a fluid-like flow behavior. As discussed herein, the reaction conditions are very harsh to any exposed metal surface as the metal surface will act as a catalyst for the reaction. Thus, the reaction will result in the slow degradation of an exposed metal surface. Accordingly, the interior surface of the reactor, including the reactor walls 414 and heads 416, as well as the distributor plate 410, and other parts, can be made of a protective material such as ceramic or gold.

As the hot gas feed stream 404 flows through the fluidized bed of catalyst particles 412, CNTs 402 will form from catalyst particles 412. The flowing hot gas feed stream 404 carries the CNTs 402 into an overhead line 418 where they are removed from the reactor 400. Depending on the flow rate, for example, as adjusted by the control valve 408, some amount of catalyst particles 412, or particles fragmented from the catalyst particles 412, may be carried into the overhead line 418. In addition, water formed in the process may be carried out of the fluidized bed reactor 400 into the overhead line 418. This water can be condensed to form a waste water stream, which may be contaminated with some portion of the CNTs 402.

Reactor Systems

Figure 5:
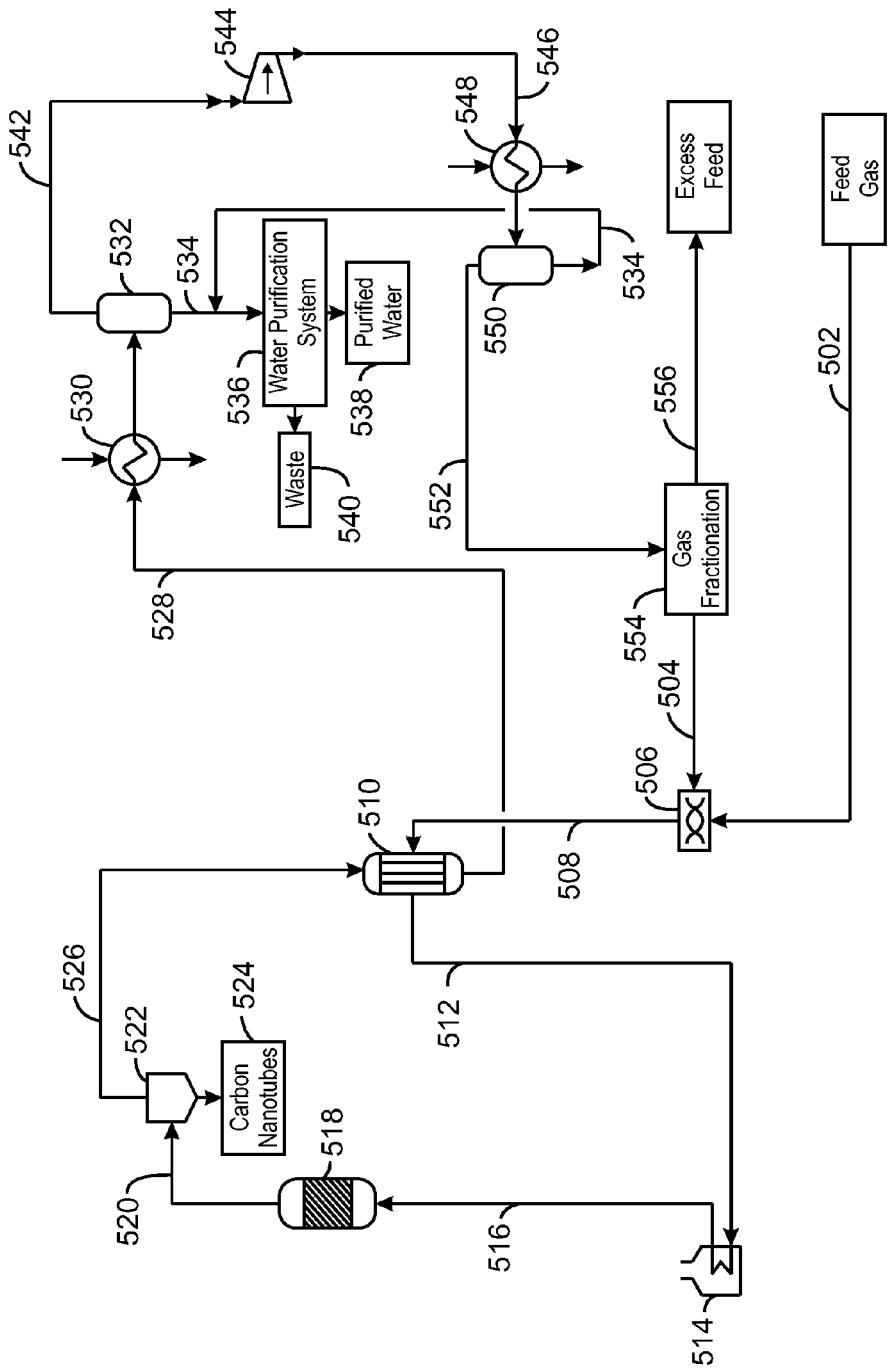
FIG. 5 is a simplified process flow diagram of a one reactor system for making CNTs from a gas feed that includes carbon dioxide and methane.

FIG. 5 is a simplified process flow diagram of a one reactor system 500 for making CNTs from a gas feed that includes carbon dioxide and methane. As shown, the one reactor system 500 can be used for feed gas 502 that is higher in $CO_2$ or higher in $CH_4$. In the reaction system 500, the feed gas 502 is combined with a recycle gas 504 that has an enhanced concentration of the lesser gas. The mixing can be performed using a static mixer 506.

The combined gas stream 508 is passed through a heat exchanger 510 or set of heat exchangers 510 in series to be heated by a reactor effluent stream. The temperature can be raised from a near ambient temperature, as defined herein, to an appropriate reaction temperature, such as about 500° C. (930° F.), about 600° C. (about 1112° F.), about 700° C. (about 1292° F.), about 800° C. (about 1472° F.), or about 900° C. (about 1652° F.) for the heated gas stream 512. This temperature may be sufficient for maintaining the reaction during continuous operations. However, part of the heat may be provided by a package heater 514, which may be especially useful for adding heat to bring the reactants up to temperature during start-up. The hot gas stream 516 is then introduced into a fluidized bed reactor 518. A general fluidized bed reactor that may be used in embodiments is discussed above with respect to FIG. 4. In the fluidized bed reactor 518, CNTs are formed on catalyst particles. The catalyst particles and reactions are discussed above with respect to FIG. 3.

The CNTs are carried from the fluidized bed reactor 518 in a reactor effluent stream 520. The reactor effluent stream 520 may be at an elevated temperature, for example, about 600° C. (about 1112° F.), about 700° C. (about 1292° F.), about 800° C. (about 1472° F.), or about 900° C. (about 1652° F.), and may be cooled by exchanging heat with the combined gas stream 508, for example, providing some or all of the heat used to heat the reactants. Either prior to or after cooling, the reactor effluent stream 520 is passed through a separation device 522, such as a cyclonic separator, to remove the CNTs 524. The resulting waste gas stream 526 can used to provide heat to the combined gas stream 508 in the heat exchanger 510. The carbon may also be removed in secondary separation devices (not shown) at lower temperatures than the waste gas stream 526.

After providing heat to the combined gas stream 508, the cooled waste stream 528 is passed through an ambient temperature heat exchanger 530 and then fed to a separation vessel 532. Water 534 settles in the separation vessel 532 and is removed from the bottom. The water 534 may then be fed into a water purification system 536. The water purification system 536 may produce a purified water stream 538, as well as a waste stream 540.

The water purification system 536 may be used to remove CNTs from the cooled waste stream 528 through a number of separation techniques. In various embodiments, the water purification system 536 may be configured to produce a carbon oxide from the CNTs within the water 534. For example, an oxidation process may be used to form the carbon oxide from the CNTs within the water 534. The carbon oxide may then be released as the waste stream 540. An ozone stream may also be mixed with the water 534 to effect the separation of the CNTs from the water 534.

In some embodiments, an air sparging process may be used to effect a separation of the CNTs from the water 534. A flocculant may be added to the water 534 within the water purification system 536 to effect a separation of the CNTs from the water 534. Further, in some embodiments, a hydrocyclone, zeolite beds, molecular sieves, or a filter, such as a filter configured to perform a reverse osmosis process, may be used to remove the CNTs, as well as any other impurities included within the waste stream 540, from the water 534.

In some embodiments, flame degradation may be used to dispose of the CNTs. For example, an underwater burner may be used to produce an underwater flame for degrading the CNTs. As another example, an incineration process may be used to dispose of the water 534. A heat exchanger may be used to recover at least a portion of the water 534 from the steam through a condensation process.

The resulting gas stream 542 from the separation vessel 532 may be significantly cooler, for example, at about 30° C., about 38° C. (about 100° F.), about 40° C. and at a pressure of about 2500, kiloPascals (kPa), about 3000 kPa, about 3720 kPa (about 240 psia), or about 4000 kPa. In one embodiment, the gas is then dried to a low dew point in a drier (not shown). The stream enters a compressor 544 that increases the pressure of the gas stream 542 to about 5000 kPa, about 6000 kPa, about 7000 kPa, about 7,240 kPa (about 1050 psia), or about 8000 kPa, forming a high pressure stream 546 that is passed through another ambient temperature heat exchanger 548. From the ambient temperature heat exchanger 548, the high pressure stream 546 is fed to a separation vessel 550 for removal of any remaining water 534, for example, if a drier has not been used. The water 534 may be combined with the water 534 from the separation vessel 532 and fed into the water purification system 536.

In embodiments in which the $CO_2$ is in excess in the feed gas 502, the dried gas stream 552 can be sent to a gas fractionation system 554, which separates the excess feed 556 from the recycle gas 504. In reaction systems 500 based on a proportionate excess of $CO_2$, the excess feed 556 may primarily include $CO_2$, and the recycle gas 504 may primarily include $CH_4$. In reaction systems 500 based on a proportionate excess of $CH_4$, the excess feed 556 will not have a substantial $CO_2$ content, and a portion may be recycled without further purification, for example, replacing the gas fractionation system 554 with a manifold. In some embodiments, a portion of the excess feed 556, the recycle gas 504, or both may be used to provide a fuel gas stream, a purge gas stream, or both for use in the plant.

Figure 6:
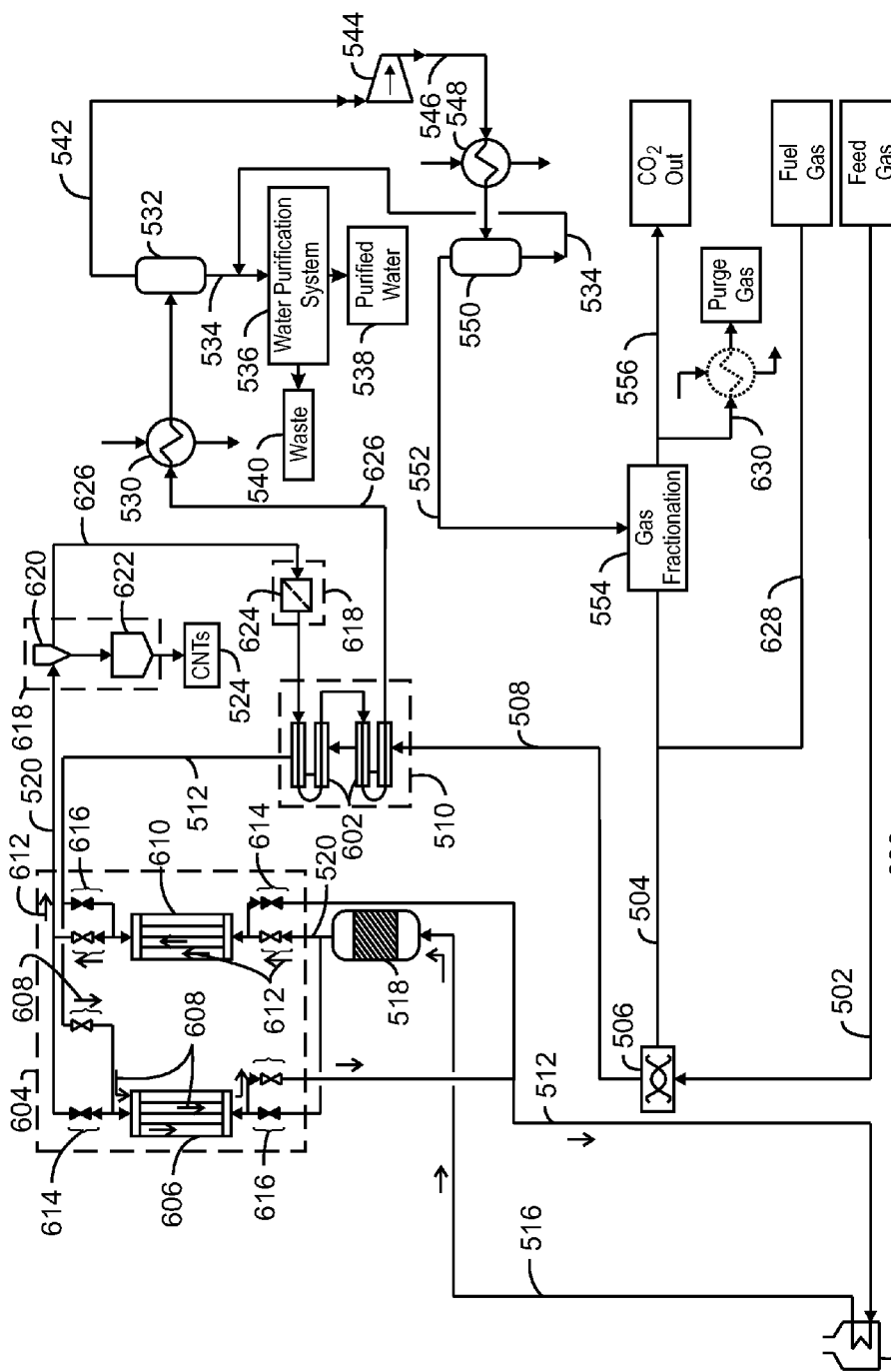
FIG. 6 is a simplified process flow diagram of a one reactor system for making CNTs from a gas feed that includes carbon dioxide and methane, in which the carbon dioxide is in excess.

FIG. 6 is a simplified process flow diagram of a one reactor system 600 for making CNTs from a gas feed that includes carbon dioxide and methane, in which the carbon dioxide is in excess. In FIG. 6, like numbered items are as described with respect to FIG. 5. As described with respect to FIG. 5, the feed gas 502 passes through a static mixer 506 where it is combined with a recycle gas 504, which is high in methane. The combined gas stream 508 is passed through a heat exchanger 510, for example, including multiple shell and tube heat exchangers 602. The main difference between the more detailed process flow diagram of FIG. 6 and that of FIG. 5 is the use of heat exchangers to cool the reactor effluent stream 520 prior to separating the CNTs from the reactor effluent stream 520.

In this embodiment, the heated gas stream 512 is raised to a temperature of about 300° C., about 400° C., about 427° C. (about 800° F.), or about 500° C. in the heat exchanger 510 prior to flowing through a second heat exchanger 604. In the second heat exchanger 604, the heated gas stream 512 flows through a first ceramic block heat exchanger 606, as indicated by arrows 608. Heat stored in the first ceramic block heat exchanger 606 is exchanged to the heated gas stream 512 and may increase the temperature to between about 500° C. (about 932° F.) and to about 550° C. (about 1022° F.). In another embodiment, the feed is heated to between about 700° C. (about 1292° F.) to about 750° C. (about 1382° F.). In another embodiment, the feed is heated to between about 800° C. (about 1472° F.) to about 850° C. (about 1562° F.).

While the first ceramic block heat exchanger 606 is used to heat the heated gas stream 512, a second ceramic block heater 610 is used to cool the reactor effluent stream 520 by flowing this stream through the second ceramic block heater 610, as indicated by arrows 612. When the second ceramic block heat exchanger 610 reaches a selected temperature, or the first ceramic block heat exchanger 606 drops to a selected temperature, the positions of the inlet valves 614 and outlet valves 616 are changed. In other words, open valves are closed and closed valves are opened. The change in the positions of the valves changes which ceramic block heat exchanger 606 or 610 is being heated by the flow from the reactor 518, as well as which ceramic block heat exchanger 606 or 610 is used to heat the heated gas stream 512.

The heat may not be sufficient to increase the temperature sufficiently for reaction. Thus, as described with respect to FIG. 5, a package heater 514 can be used to further boost the temperature of the heated gas stream 512, forming the hot gas stream 516, which can be fed to the fluidized bed reactor 518. CNTs are formed in the fluidized bed reactor 518, and carried out in the reactor effluent stream 520.

After flowing through the second ceramic block heater 610, the reactor effluent 520 is flowed to a separation system 618, which is used to remove the CNTs from the reactor effluent 520. In this embodiment, the separation system 618 for the CNTs includes a cyclonic separator 620, a lock hopper 622, and a filter 624. After the majority of the CNTs are removed by the cyclonic separator 620 and deposited into the lock hopper 622, the filter 624 is used to remove remaining CNTs from the waste gas stream 626. This may help to prevent plugging, or other problems, caused by residual CNTs in the waste gas stream 626. The filter 624 can include bag filters, sintered metal filters, and ceramic filters, among other types. From the separation system 618, the CNTs may be directed to a packaging system. After the filter 624, the waste gas stream 626 is flowed through the heat exchanger 510 before flowing to the ambient temperature heat exchanger 530 and then fed to a separation vessel 532 for separation of the water 534. After flowing through the separation vessel 532, the flow is as described with respect to FIG. 5.

In this embodiment, two extra streams may be provided from the separated streams out of the gas fractionation system 554. A fuel gas stream 628 may be taken from the recycle gas 504 and sent to a power plant. A purge gas stream 630 may be taken from the $CO_2$ outlet stream, which can be used to purge various pieces of equipment, such as the filter 624 or cyclone 620.

Water Purification Systems

Figure 7:
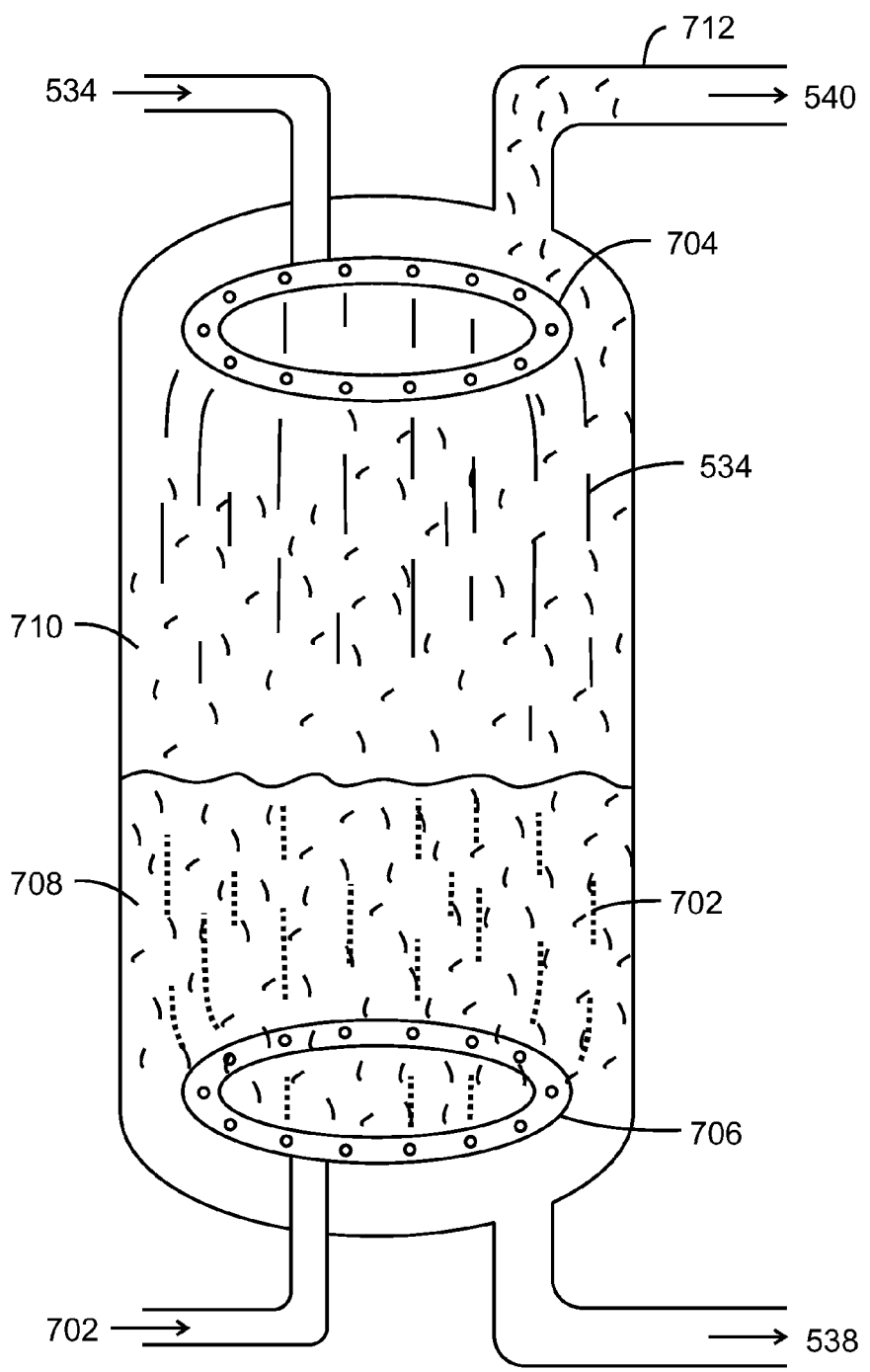
FIG. 7 is a schematic of a water purification system that is configured to separate the water into the purified water stream and the waste stream through the addition of a flocculant.

FIG. 7 is a schematic of a water purification system 700 that is configured to separate the water 534 into the purified water stream 538 and the waste stream 540 through the addition of a flocculant 702. Like numbered items are as described with respect to FIG. 5. The flocculant 702 may be an organic liquid hydrocarbon or any other material not miscible in water. The water 534 may include CNTs and other impurities when it enters the water purification system 700. The water 534 may be injected into the top of the water purification system 700 via a first sparge ring 704. The flocculant 702 may be injected into the bottom of the water purification system via a second sparge ring 706. The flocculant 702 may capture the CNTs and other organic material, for example, by agglomeration, flocculation, or dissolution, and move the contaminants out of an aqueous phase 708 and into an organic phase 710. The CNTs and other organic material may then exit the water purification system 700 as the waste stream 540 via an overhead line 712. Pure water may sink to the bottom of the water purification system 700, and may exit the water purification system 700 as the purified water stream 538.

Figure 8:
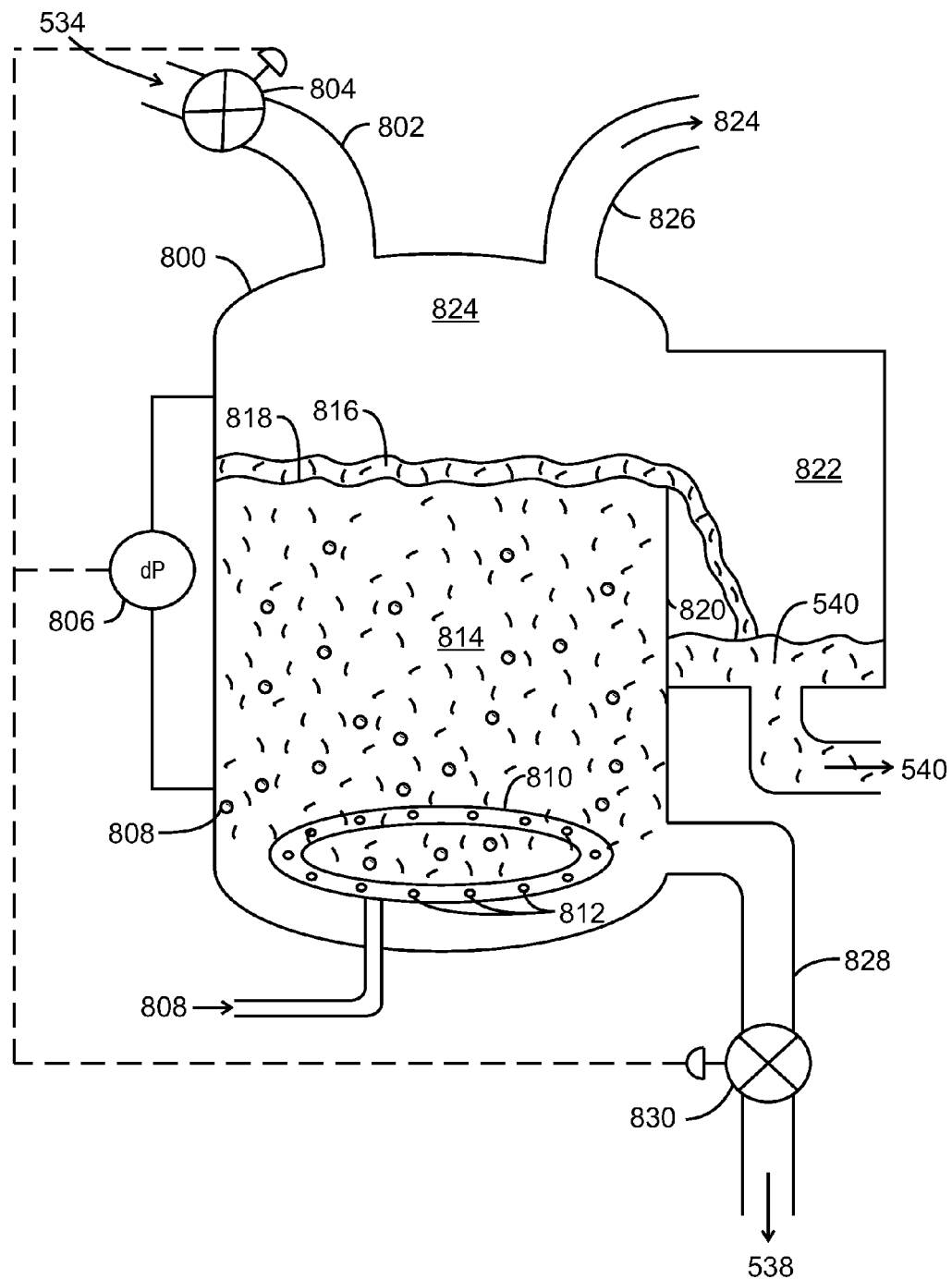
FIG. 8 is a schematic of a water purification system that is configured to separate the water into the purified water stream and the waste stream through an air sparging process, or any number of other gas injection processes, including, for example, an ozonolysis process.

FIG. 8 is a schematic of a water purification system 800 that is configured to separate the water 534 into the purified water stream 538 and the waste stream 540 through an air sparging process, or any number of other gas injection processes, including, for example, an ozonolysis process. Like numbered items are as described with respect to FIG. 5. The water 534 may be injected into the top of the water purification system 800 via an overhead line 802, as shown in FIG. 8, or may injected into the side of the water purification system 800. The rate of injection of the water 534 may be controlled using a valve 804, which may be opened, partially opened, or closed, depending on the fluid level within the water purification system 800 as measured by a fluid level sensor 806. In some embodiments, the fluid level sensor 806 may be a differential pressure sensor.

A gas stream 808 may be injected into the bottom of the purification system 800 through a sparge ring 810, which may contain pores 812, or holes, through which the gas stream 808 may pass, forming bubbles. In the case of an air sparging process, the gas stream 808 can be an air stream, an argon stream, or a nitrogen stream, among others. In the case of an ozonolysis process, the gas stream 808 includes ozone.

As the bubbles from the gas stream 808 rise through the purification system 800, the gas stream 808, e.g., the air stream or the ozone stream, may mix with the water 534, resulting in the formation of a mixture 814. This may cause a chemical or physical reaction in which impurities within the water 534 separate from the purified water stream 538, forming the waste stream 540. For example, the bubbles can carry small particles, such as CNTs, to the surface.

In various embodiments, as the gas stream 808 mixes with the water 534, the waste stream 540 is generated in the form of a froth 816, which floats to a surface 818 of the mixed stream 814. This may result in the separation of the mixed stream 814 within the purification system 800 into two separate layers, i.e. the purified water stream 538 and the waste stream 540.

In various embodiments, the froth 816 may be removed from the purification system 800 by skimming the froth 816 from the surface over a weir 820 and into a tank 822. The tank 822 may be physically attached to the purification system 800. Once the froth 816 enters the tank 822, the froth 816 may be removed from the tank as the waste stream 540, as shown in FIG. 8. In some embodiments, the waste stream 540 may then be flowed into any of a number of separation devices, such as a dryer, filter, centrifuge, or flocculation tank, among others. Thus, remaining CNTs may be recovered from the waste stream 540. In addition, residual water within the waste stream 540 may be recovered through a secondary water purification process.

In addition, as the mixed stream 814 is generated within the purification system 800, a waste gas stream 824 is generated. The waste gas stream 824 may include sparged gas, such as air, nitrogen, argon, or ozone, among others, that was injected into the purification system 800 as the gas stream 808, as well as other light ends degassed from the water. In various embodiments, the waste gas stream 824 may be a carbon oxide, such as carbon monoxide or carbon dioxide. The waste gas stream 824 may be removed from the purification system 800 through an overhead line 826. In some embodiments, the waste gas stream 824 may be recycled and reused within the purification system 800, or may be flowed to a separation system for the recovery of any valuable gaseous components from the waste gas stream 824, for example, for recycling into the CNT production process.

The purified water stream 538 may be removed from the purification system 800 though a line 828. In addition, a valve 830 may be used to control the rate of removal of the purified water stream 538. The valve 830 may be opened, partially opened, or closed, depending on the fluid level within the water purification system 800 as measured by the fluid level sensor 806.

Figure 9:
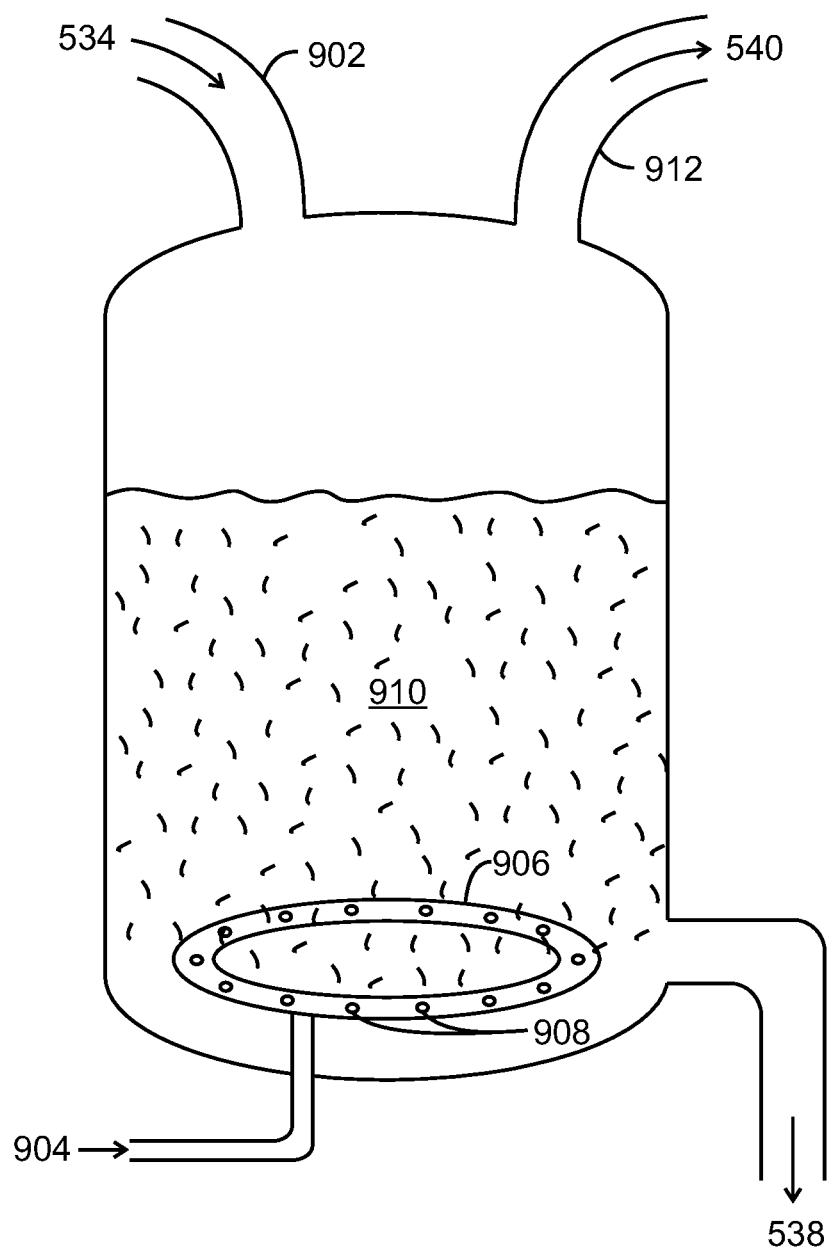
FIG. 9 is a schematic of a water purification system that is configured to separate the water into the purified water stream and the waste stream through an oxidation process.

FIG. 9 is a schematic of a water purification system 900 that is configured to separate the water 534 into the purified water stream 538 and the waste stream 540 through an oxidation process. Like numbered items are as described with respect to FIG. 5. The water 534 may be flowed into the purification system 900 through an overhead line 902. In addition, an oxygen stream 904 may be flowed into the bottom of the purification system 900 through a sparge ring 906. The sparge ring 906 may contain pores 908, or holes, through which the oxygen stream 904 may pass.

As the oxygen stream 904 rises through the purification system 900, it mixes with the water 534, resulting in the formation of a mixed stream 910. In addition, a gas stream, i.e., the waste stream 540, may be generated. The waste stream 540 may include carbon oxides produced during the oxidation process.

As the waste stream 540 separates from the mixed stream 910, it may rise through the purification system 900 and exit through an overhead line 912. In some embodiments, the waste stream 540 may be flowed into a separation system, in which carbon products, such as any residual CNTs, may be recovered. In addition, water vapor contained within the waste stream 540 may be condensed to recover additional water. The additional water may then be combined with the purified water stream 538. In some embodiments, the purified water stream 538 may be flowed to additional purification systems. For example, the purified water stream 538 may be flowed through a hydrocyclone, a filter, or an incinerator, among others.

Further, in some embodiments, the oxygen stream 904 is an ozone stream. In such embodiments, the water 534 is separated into the purified water stream 538 and the waste stream 540 through an ozonolysis process. In addition, the waste stream 540 may include carbon oxides produced during the ozonolysis process.

Figure 10:
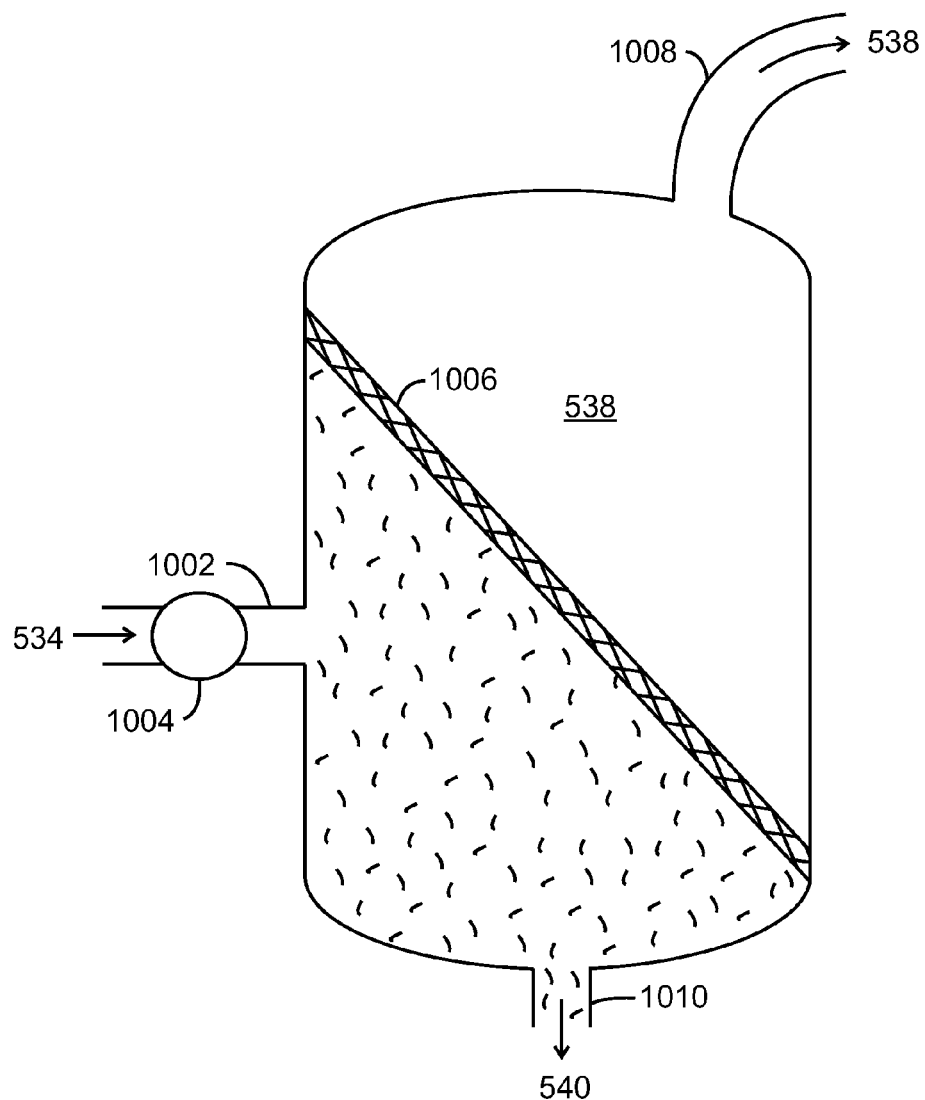
FIG. 10 is a schematic of a water purification system that is configured to separate the water into the purified water stream and the waste stream through a reverse osmosis process.

FIG. 10 is a schematic of a water purification system 1000 that is configured to separate the water 534 into the purified water stream 538 and the waste stream 540 through a reverse osmosis process. Like numbered items are as described with respect to FIG. 5. The water 534 may be flowed into the purification system 1000 through a line 1002. In some embodiments, the line 1002 includes a pump 1004 that is used to increase the pressure within the purification system 1000.

The purification system 1000 includes a semipermeable membrane 1006, which allows molecules in a certain size and polarity range to pass though, while blocking salts, larger molecules, and particulates. In various embodiments, the semipermeable membrane 1006 is permeable to water but impermeable to CNTs and other residual impurities contained within the water 534. Thus, the purified water stream 538 may separate from the waste stream 540 by passing through the semipermeable membrane 1006.

The purified water stream 538 may then be flowed out of the purification system 1000 through an overhead line 1008, while the waste stream 540 may be flowed out of the bottom of the purification system 1000 through a line 1010. In some embodiments, the waste stream 540 may be flowed to further separation systems, which may recover CNTs and any other components from the waste stream 540.

Figure 11:
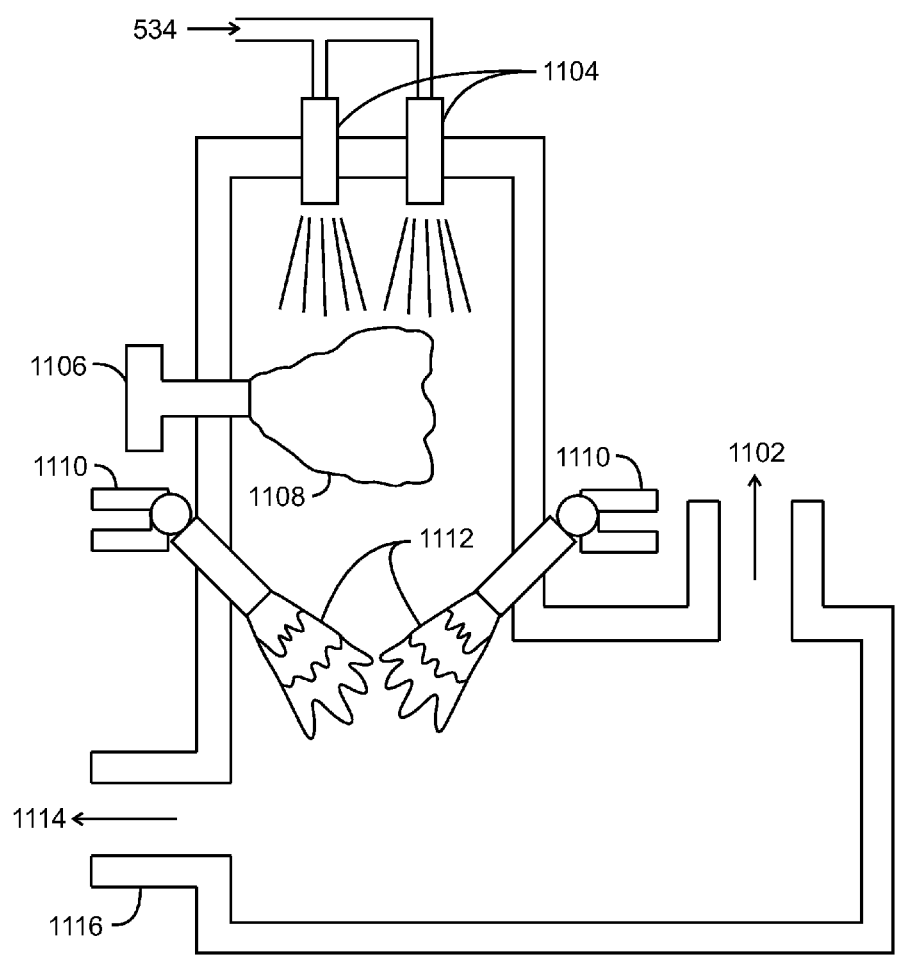
FIG. 11 is a schematic of a flame degradation vessel that may be used to remove CNTs from the water through the formation of steam.

FIG. 11 is a schematic of a flame degradation vessel 1100 that may be used to remove CNTs from the water 534 through the formation of steam 1102. Like numbered items are as described with respect to FIG. 5. The flame degradation vessel 1100, or incinerator, may be utilized for the recovery of the purified water stream 538 in the form of steam 1102. The flame degradation vessel 1100 may be used for cases in which the full recovery of the purified water stream 540 is not desired.

The water 534 may be injected into the top of the flame degradation vessel 1100 through a number of water sprayers 1104. A combustion air inlet 1106 located below the water sprayers 1104 may be configured to inject an oxidizing agent 1108, such as air or enriched air, into the flame degradation vessel 1100. The oxidizing agent 1108 may mix with the water 534 as it passes through the flame degradation vessel 1100.

Burners 1110 may be located below the combustion air inlet 1106 on each side of the flame degradation vessel 1100. The burners 1110 may be configured to inject a fuel 1112, such as oil or natural gas, into the flame degradation vessel 1100. The fuel 1112 may mix with the oxidizing agent 1108 and the water 534, resulting in the combustion of the oxidizable impurities in the water 534.

As a result of the combustion reaction, the CNTs and other impurities within the water 534 may be reduced to ash 1114 or carbon oxides. The ash 1114 may be removed from the flame degradation vessel 1100 through an exit portal 1116. In addition, the water 534 and any carbon oxides, including those formed by combusting the fuel, may be removed from the flame degradation vessel 1100 in the form of the steam 1102. In some embodiments, some portion of the purified water stream 538 may be recovered from the steam 1102 through a condensation process. This may be accomplished using, for example, a heat exchanger or chiller, among others.

Figure 12:
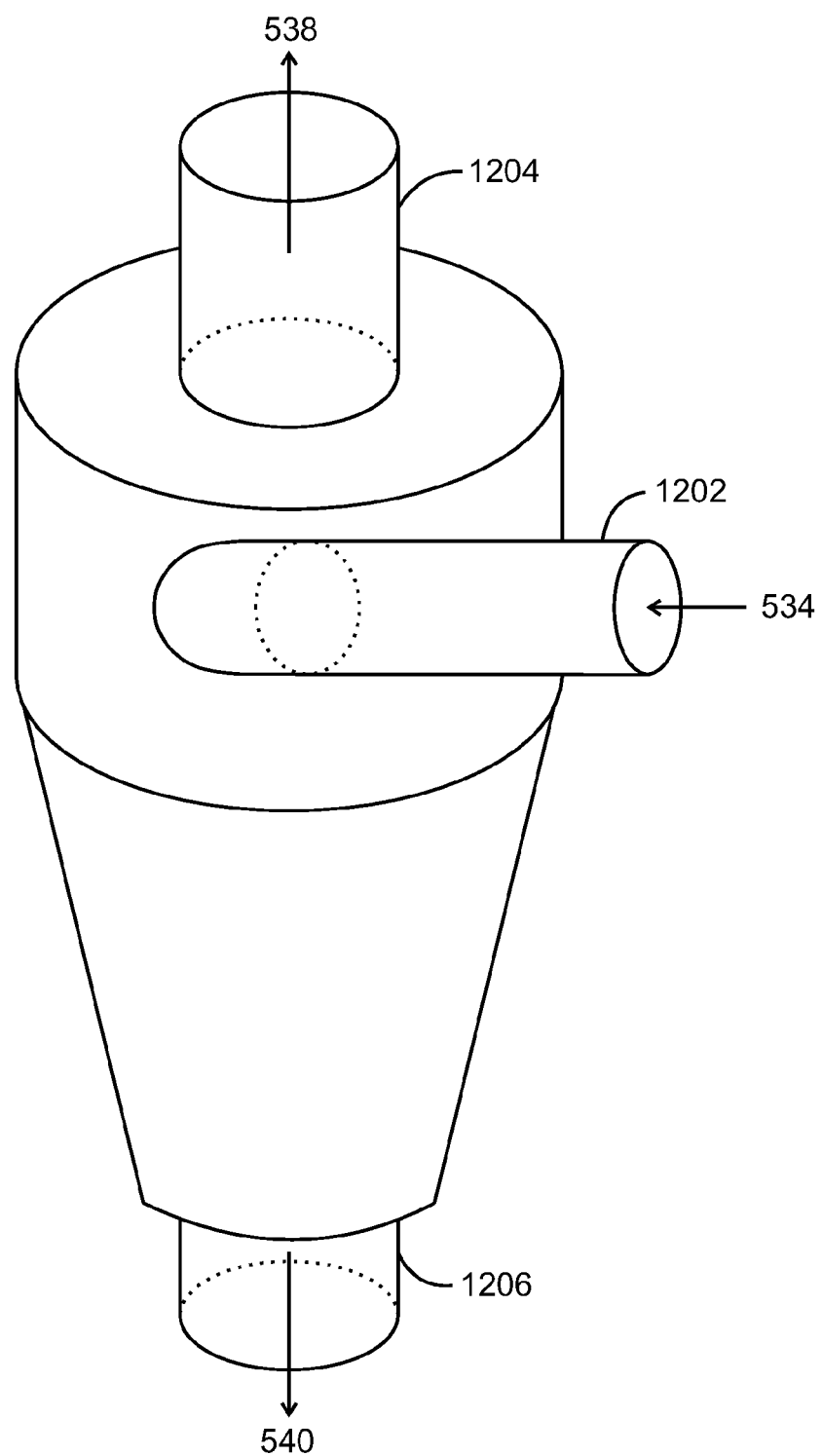
FIG. 12 is a schematic of a hydrocyclone that may be used to separate the water into the purified water stream and the waste stream.

FIG. 12 is a schematic of a hydrocyclone 1200 that may be used to separate the water 534 into the purified water stream 538 and the waste stream 540. Like numbered items are as described with respect to FIG. 5. The hydrocyclone 1200 may include a single hydrocyclone, as shown in FIG. 9, or multiple hydrocyclones.

The water 534 may be injected into the hydrocyclone 1200 through a line 1202 located near the top of the hydrocyclone 1200. As water 534 enters the hydrocyclone 1200, a swirl element within the hydrocyclone 1200 may impart a radial acceleration and a tangential velocity component to the water 534 through the rotation of twisted swirl vanes. The swirl vanes may be arranged parallel or in series on the swirl element. The swirling of the water 534 may cause the waste stream 540, which contains CNTs and other impurities that are heavier and denser than the other particles within the water 534, to migrate to the outer rim of the hydrocyclone 1200 and begin traveling in a wide circular path, while the water molecules may migrate towards the center of the hydrocyclone 1200 and begin traveling in a narrow circular path. As the water 534 nears the end of the hydrocyclone 1200, the water molecules may be captured and sent out of the hydrocyclone 1200 as the purified water stream 538 via an overhead line 1204. The waste stream 540 may also be sent out of the bottom of the hydrocyclone 1200 via a line 1206.

Method

Figure 13:
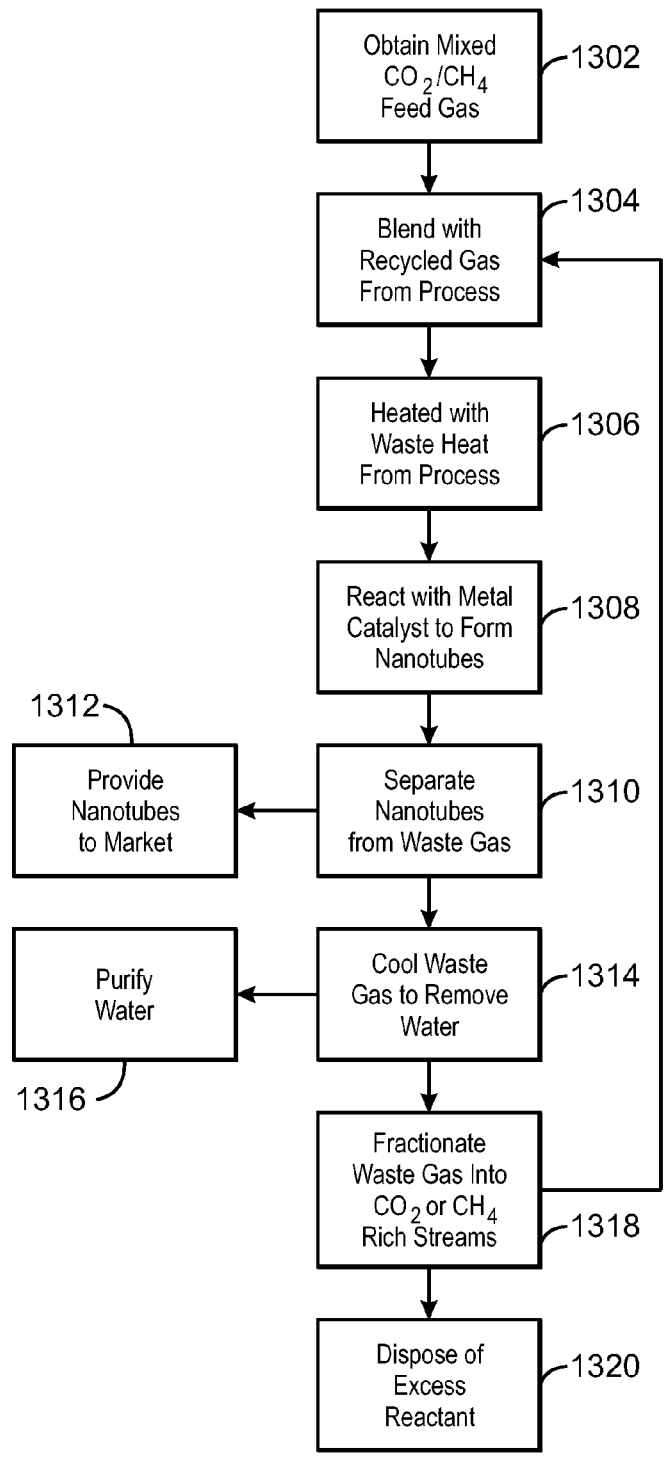
FIG. 13 is a process flow diagram showing a method for generating CNTs from a feed gas that includes methane and carbon dioxide.

FIG. 13 is a process flow diagram showing a method 1300 for generating CNTs from a feed gas that includes methane and carbon dioxide. The method 1300 begins at block 1302, at which a mixed $CO_2/CH_4$ feedstock is obtained. The feedstock may be obtained from any number of sources. As mentioned, the feedstock may include a natural gas harvested from a sub-surface reservoir, an exhaust gas from a power generation plant, or any number of other gases from natural or plant sources. Further, other feedstocks may be used in embodiments, including other materials, such as syngas, CO, $H_2$, other hydrocarbons, and the like.

At block 1304, the feedstock is combined with a recycle gas obtained from the wastes gases generated in the process. As described herein, the recycle gas may be obtained from the waste gases by cryogenic gas fractionation, as well as any number of other techniques. At block 1306, the combined gas stream is heated with waste heat recovered from the reaction process. After heating, at block 1308, the combined gas stream is reacted with a metal catalyst in a reactor to form the CNTs. At block 1310, the CNTs are separated from the waste gas. At block 1312, the separated CNTs are purged, cooled, and packaged to be sent to market.

At block 1314, the waste gas is cooled to remove excess water formed during the reaction. As the process is conducted at high temperatures and pressures, an ambient temperature heat exchanger provides sufficient cooling to condense out the water vapor. The processes described at blocks 1306-1314 will be repeated for each sequential reactor in the reaction system.

At block 1316, the excess water that was removed from the waste gas may be purified. The purification of the water may be accomplished using any of a number of purification systems, such as those discussed with respect to FIGS. 7-12. For example, one method by which the water may be purified is discussed below with respect to FIG. 14.

At block 1318, the waste gas may be fractionated into a $CO_2$ enriched stream and a $CH_4$ enriched stream. If a low $CO_2$ feedstock was used, the excess reagents may be recycled without further processing. At block 1320, whichever stream contains the excess reagent can be sold, while the other stream can be recycled to block 1304 to be used in the process.

FIG. 13 is not intended to indicate that the steps of the method 1300 are to be executed in any particular order, or that all of the steps of the method 1300 are to be included in every case. Further, any number of additional steps may be included within the method 1300, depending on the specific application.

Figure 14:
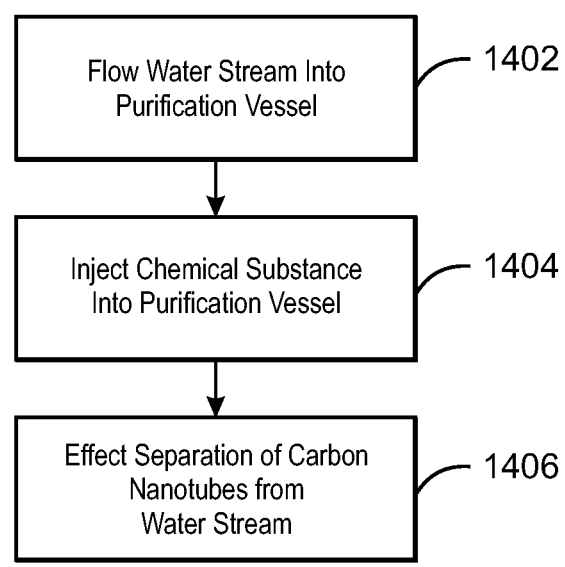
FIG. 14 is a process flow diagram showing a method for the removal of CNTs from a water stream.

FIG. 14 is a process flow diagram showing a method 1400 for the removal of CNTs from a water stream. The method begins at block 1402 with the flowing of a water stream into a purification vessel. The water stream may include water that is contaminated with residual CNTs. The purification vessel may be a water purification system that is configured to remove or degrade the residual CNTs in the water within the water stream. In some embodiments, the water stream may be flowed into the purification vessel from a separation vessel, as discussed above.

At block 1404, a chemical substance may be injected into the purification vessel. The chemical substance may be, for example, air, a flocculant, or ozone.

At block 1406, a separation of the CNTs from the water stream may be effected through an interaction of the chemical substance with the CNTs within the purification vessel. In some embodiments, if the chemical substance is air, effecting the separation of the CNTs from the water stream includes effecting a removal of the CNTs through an air sparging process. In other embodiments, if the chemical substance is a flocculant, effecting the separation of the CNTs from the water stream includes removing the CNTs through an interaction of the flocculant with the CNTs within the sparge vessel. Further, in other embodiments, if the chemical substance is ozone, effecting the separation of the CNTs from the water stream includes removing the CNTs from the water stream through an ozonolysis process. In addition, the CNTs may be removed from a sparge vessel by flowing the CNTs over a weir and into a collection vessel.

FIG. 14 is not intended to indicate that the steps of the method 1400 are to be executed in any particular order, or that all of the steps of the method 1400 are to be included in every case. Further, any number of additional steps may be included within the method 1400, depending on the specific application.

Embodiments

Embodiments of the invention may include any combinations of the methods and systems shown in the following numbered paragraphs. This is not to be considered a complete listing of all possible embodiments, as any number of variations can be envisioned from the description above.

1. A method for removing carbon nanotubes from a water stream, including flowing the water stream into a purification vessel, wherein the purification vessel is configured to form a carbon oxide from the carbon nanotubes within the water stream.

2. The method of paragraph 1, including using an air sparging process to form the carbon oxide from the carbon nanotubes within the water stream.

3. The method of any of paragraphs 1 or 2, including adding a flocculant to the water stream to effect a separation of the carbon nanotubes from the water stream.

4. The method of any of paragraphs 1-3, including mixing an ozone stream with the water stream to effect a separation of the carbon nanotubes from the water stream.

5. The method of any of paragraphs 1-4, including using a hydrocyclone to remove the carbon nanotubes from the water stream.

6. The method of any of paragraphs 1-5, including filtering the carbon nanotubes out of the water stream through a reverse osmosis process.

7. The method of any of paragraphs 1-6, including forming the carbon oxide from the carbon nanotubes within the water stream through an oxidation process.

8. The method of any of paragraphs 1-7, including using an underwater burner to produce an underwater flame for degrading the carbon nanotubes.

9. The method of any of paragraphs 1-8, including using a flame degradation vessel to remove the carbon nanotubes from the water stream through a formation of steam.

10. The method of paragraph 9, including using a heat exchanger to recover at least a portion of the water stream from the steam through a condensation process.

11. The method of any of paragraphs 1-9, including removing the carbon nanotubes from the water stream through a filtration process.

12. The method of any of paragraphs 1-9 or 11, including obtaining the water stream from a stream coming from a reactor through a chilling process.

13. The method of any of paragraphs 1-9, 11, or 12, including using molecular sieves to remove the carbon nanotubes from the water stream.

14. The method of any of paragraphs 1-9 or 11-13, including using zeolites to remove the carbon nanotubes from the water stream.

15. The method of any of paragraphs 1-9 or 11-14, wherein flowing the water stream into the purification vessel includes flowing the water stream from a separation vessel to the purification vessel, and wherein the separation vessel is configured to perform an initial separation of the water stream from a carbon nanotube product.

16. A system for removing carbon nanotubes from a water stream including a purification vessel, wherein the purification vessel is configured to form a carbon oxide from the carbon nanotubes within the water stream.

17. The system of paragraph 16, wherein the purification vessel includes an air sparge vessel configured to remove the carbon nanotubes from the water stream by forming a froth phase that can be separated from a clean water phase using injected air.

18. The system of any of paragraphs 16 or 17, wherein the purification system is configured to inject a flocculant into the water stream, and wherein the flocculant causes a removal of the carbon nanotubes from the water stream.

19. The system of any of paragraphs 16-18, wherein the purification system is configured to form the carbon oxide from the carbon nanotubes within the water stream through an ozonolysis process.

20. The system of any of paragraphs 16-19, including a hydrocyclone for removing large carbon nanotubes from the water stream before the water stream is flowed into the purification vessel.

21. The system of any of paragraphs 16-20, including removing the carbon nanotubes from the water stream through a reverse osmosis process.

22. The system of any of paragraphs 16-21, wherein the purification vessel includes an underwater burner configured to produce an underwater flame for degrading the carbon nanotubes.

23. The system of any of paragraphs 16-22, wherein the purification vessel includes a flame degradation vessel configured to remove the carbon nanotubes from the water stream through a formation of steam.

24. The system of any of paragraphs 16-23, wherein the water stream is obtained from a stream coming from a reactor through a condensation process.

25. A method for purifying a water stream including carbon nanotubes, including:
flowing the water stream into a purification vessel;
injecting a chemical substance into the purification vessel; and
effecting a separation of the carbon nanotubes from the water stream through an interaction of the chemical substance with the carbon nanotubes within the purification vessel.

26. The method of paragraph 25, wherein the chemical substance includes air, and wherein effecting the separation of the carbon nanotubes from the water stream includes effecting a removal of the carbon nanotubes through an air sparging process.

27. The method of any of paragraphs 25 or 26, wherein the chemical substance includes a flocculant, and wherein effecting the separation of the carbon nanotubes from the water stream includes removing the carbon nanotubes through an interaction of the flocculant with the carbon nanotubes within the purification vessel.

28. The method of any of paragraphs 25-27, wherein the chemical substance includes ozone, and wherein effecting the separation of the carbon nanotubes from the water stream includes removing the carbon nanotubes from the water stream through an ozonolysis process.

29. The method of any of paragraphs 25-28, including removing the carbon nanotubes from the purification vessel by flowing the carbon nanotubes over a weir and into a collection vessel.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method comprising:
forming carbon nanotubes in a reactor in a Bosch reaction;
separating the carbon nanotubes from a reactor effluent stream, forming a waste gas stream;
condensing water in the waste gas stream giving a water stream;
removing carbon nanotubes from the water stream to give a purified water stream, wherein removing the carbon nanotubes comprises forming carbon oxide from the carbon nanotubes within the water stream to give the purified water stream.

2. The method of claim 1, comprising discharging the reactor effluent stream overhead from the reactor, wherein the reactor comprises a fluidized bed reactor, and wherein forming carbon oxide comprises air sparging the water stream in a vessel to form the carbon oxide from the carbon nanotubes within the water stream.

3. The method of claim 1, wherein removing further comprises adding a flocculant to the water stream to effect a separation of the carbon nanotubes from the water stream.

4. The method of claim 1, wherein removing further comprises sparge mixing an ozone stream with the water stream to form a froth in a vessel to effect a separation of the carbon nanotubes from the water stream, and wherein forming carbon oxide comprises oxidizing carbon nanotubes via the sparge mixing of the ozone stream with the water stream to form the carbon oxide.

5. The method of claim 1, wherein separating comprises separating the carbon nanotubes from the reactor effluent stream via a cyclonic separator, and wherein removing further comprises flowing the water stream through a hydrocyclone to remove the carbon nanotubes from the water stream.

6. The method of claim 1, wherein removing further comprises filtering the carbon nanotubes out of the water stream through reverse osmosis.

7. The method of claim 1, wherein condensing water in the waste gas stream gives a dry waste gas stream, wherein the method further comprises compressing the dry waste gas stream and condensing water in dry waste gas stream, and wherein forming carbon oxide comprises forming the carbon oxide from the carbon nanotubes within the water stream through oxidation of the carbon nanotubes.

8. The method of claim 1, wherein forming carbon oxide comprises producing an underwater flame via an underwater burner to degrade the carbon nanotubes to form the carbon oxide from the carbon nanotubes.

9. The method of claim 1, comprising providing feed gas to the reactor, wherein forming the carbon nanotubes comprises forming the carbon nanotubes from the feed gas in the reactor, wherein forming carbon oxide comprises passing the water stream through a flame degradation vessel to combust the carbon nanotubes into ash and the carbon oxide, and removing water and carbon oxide from the flame degradation vessel through formation of steam.

10. The method of claim 9, comprising:
heating the feed gas with waste heat from the waste gas stream; and
condensing the steam via a heat exchanger to recover water.

11. The method of claim 1, wherein removing further comprises flowing the water stream through a filter to remove carbon nanotubes from the water stream.

12. The method of claim 1, wherein condensing comprises condensing water in the waste gas stream via an ambient-temperature heat exchanger, and wherein forming carbon oxide comprises sparging at least one of air, oxygen, or ozone into the water stream in a vessel to oxidize carbon nanotubes to form carbon oxide from carbon nanotubes.

13. The method of claim 1, wherein giving the water stream comprises separating the water stream from the waste gas stream, and wherein removing the carbon nanotubes comprises flowing the water stream into a purification vessel.

14. A method for producing carbon nanotubes including purifying a water stream comprising carbon nanotubes, comprising:
reacting a feed gas with a catalyst in a reactor in a Bosch reaction to form carbon nanotubes;
discharging a reactor effluent from the reactor;
separating product carbon nanotubes from the reactor effluent, forming a waste gas stream comprising residual carbon nanotubes;
condensing, via a first heat exchanger, water in the waste gas stream to give a water stream; and
flowing the water stream into a purification vessel;
injecting air into the purification vessel; and
effecting a separation of the carbon nanotubes from the water stream through an interaction of the air with the carbon nanotubes through air sparging within the purification vessel to give a purified water stream.

15. A method for producing carbon nanotubes including purifying a water stream comprising carbon nanotubes, comprising:
reacting a feed gas with a catalyst in a reactor in a Bosch reaction to form carbon nanotubes;
discharging a reactor effluent from the reactor;
separating product carbon nanotubes from the reactor effluent, forming a waste gas stream comprising residual carbon nanotubes;
condensing water in the waste gas stream to give a water stream;
flowing the water stream into a purification vessel;
injecting ozone into the purification vessel; and
effecting a separation of the carbon nanotubes from the water stream through an interaction of the ozone with the carbon nanotubes through ozonolysis within the purification vessel to give a purified water stream.

16. The method of claim 14, comprising heating the feed gas via a second heat exchanger with waste heat from the waste gas stream, wherein effecting the separation comprises removing the carbon nanotubes from the purification vessel by flowing the carbon nanotubes over a weir and into a collection vessel.

17. A system comprising:
a reactor to form carbon nanotubes from feed gas in a Bosch reaction, the reactor comprising an inlet to receive the feed gas and an outlet to discharge the reactor effluent;
a separation device to separate carbon nanotubes from the reactor effluent, forming a waste gas stream;

a heat exchanger to condense water in the waste gas stream to give a dry waste gas stream and a water stream; and a purification system to remove carbon nanotubes from the water stream to give a purified water stream, comprising the purification system to form carbon oxide from the carbon nanotubes within the water stream.

18. The system of claim 17, wherein the separation device comprises a cyclonic separator, wherein the purification system comprises a purification vessel comprising an air sparge vessel to receive the water stream and inject air to form the carbon oxide and also to remove carbon nanotubes from the water stream by forming a froth phase having carbon nanotubes separated from a clean water phase.

19. The system of claim 18, comprising a second heat exchanger to heat the feed gas with waste heat from the waste gas stream, wherein the sparger vessel comprises a sparger ring.

20. The system of claim 17, wherein the separation device comprises an inlet to receive the reactor effluent, a first outlet to discharge the carbon nanotubes, and a second outlet to discharge the waste gas stream, and wherein the purification system is configured to inject flocculant into the water stream to remove carbon nanotubes from the water stream.

21. The system of claim 17, wherein the purification system is configured to form the carbon oxide from the carbon nanotubes within the water stream through ozonolysis or oxidation.

22. The system of claim 17, comprising a hydrocyclone to remove large carbon nanotubes from the water stream before the water stream is flowed into a purification vessel of the purification system.

23. The system of claim 17, wherein the purification system comprises a semipermeable membrane permeable to water but impermeable to carbon nanotubes to remove the carbon nanotubes from the water stream through reverse osmosis.

24. The system of claim 17, wherein the purification system comprises a purification vessel comprising an underwater burner to produce an underwater flame to degrade carbon nanotubes in the water stream received in the purification vessel to form the carbon oxide.

25. The system of claim 17, wherein the purification system comprises a purification vessel comprising a flame degradation vessel configured to oxidize the carbon nanotubes to form the carbon oxide, and to discharge carbon oxide and water through formation of steam.

26. The system of claim 17, comprising a separation vessel to cooperate with the heat exchanger to give the dry waste gas stream and the water stream, the separation vessel to discharge the water stream from a bottom portion of the separation vessel to the purification system.

27. The system of claim 17, comprising:
a compressor to compress the dry waste gas stream; and
a second heat exchanger to receive the dry waste gas stream from the compressor and condense water in the dry waste gas stream.

* * * * *